United States Patent
Young et al.

(10) Patent No.: US 8,869,551 B2
(45) Date of Patent: Oct. 28, 2014

(54) METHOD AND APPARATUS FOR FORMING CARBON DIOXIDE PARTICLES INTO BLOCKS

(75) Inventors: Frederick C. Young, Maineville, OH (US); Matthew August Gunderson, Cincinnati, OH (US); James R. Combs, Mowreystown, OH (US); Scott Thomas Hardoerfer, Milford, OH (US)

(73) Assignee: Cold Jet LLC, Loveland, OH (US)

( * ) Notice: Subject to any disclaimer, the term of this patent is extended or adjusted under 35 U.S.C. 154(b) by 210 days.

(21) Appl. No.: 13/276,937

(22) Filed: Oct. 19, 2011

(65) Prior Publication Data
US 2012/0097054 A1    Apr. 26, 2012

Related U.S. Application Data

(60) Provisional application No. 61/394,688, filed on Oct. 19, 2010.

(51) Int. Cl.
| | |
|---|---|
| *B30B 13/00* | (2006.01) |
| *B30B 15/02* | (2006.01) |
| *B30B 15/32* | (2006.01) |
| *B30B 15/30* | (2006.01) |
| *B30B 11/02* | (2006.01) |
| *C01B 31/22* | (2006.01) |

(52) U.S. Cl.
CPC ............ *C01B 31/22* (2013.01); *B30B 15/026* (2013.01); *B30B 15/32* (2013.01); *B30B 15/304* (2013.01); *B30B 11/02* (2013.01); *B30B 15/024* (2013.01); *B03B 11/04* (2013.01)
USPC ........................................................ 62/604

(58) Field of Classification Search
CPC .......... C01B 31/22; B30B 9/28; B30B 11/02; B30B 15/302; B30B 15/304; B30B 15/32; B65G 11/20; B65G 11/206; B65G 23/06
USPC ........... 62/601, 602, 603, 604, 605; 264/109, 264/115, 117, 123; 100/214, 244
See application file for complete search history.

(56) References Cited

U.S. PATENT DOCUMENTS

| | | | | |
|---|---|---|---|---|
| 2,151,855 A | * | 3/1939 | Kobold | 425/330 |
| 6,244,069 B1 | * | 6/2001 | Hyde et al. | 62/604 |

FOREIGN PATENT DOCUMENTS

| | | |
|---|---|---|
| FR | 2 578 036 | 8/1986 |
| GB | 2 111 895 | 7/1983 |
| JP | 2010 126407 | 6/2010 |

OTHER PUBLICATIONS

International Search Report dated Mar. 5, 2012 for Application No. PCT/US11/56889.
English Abstract and Machine Translation of French Patent No. FR 2 578 036.
English Abstract of Japanese Patent No. JP 2010 126407.

\* cited by examiner

*Primary Examiner* — Frantz Jules
*Assistant Examiner* — Brian King
(74) *Attorney, Agent, or Firm* — Frost Brown Todd LLC

(57) ABSTRACT

An apparatus for forming a block from carbon dioxide particle is configured to allow changing between precise thicknesses with very little downtime, utilizing both weight based and volumetric dosing. A spacer supports the lower ejection piston during block forming, with a shuttle discharging particles into the forming chamber while simultaneously pushing a previously formed block on to a conveyor. In one embodiment, the shuttle dosing cavity has a volume that is greater than the volume of the forming chamber volume, which allows more pellets, volumetrically, to be dosed into the dosing cavity than the volume of the forming cavity.

10 Claims, 36 Drawing Sheets

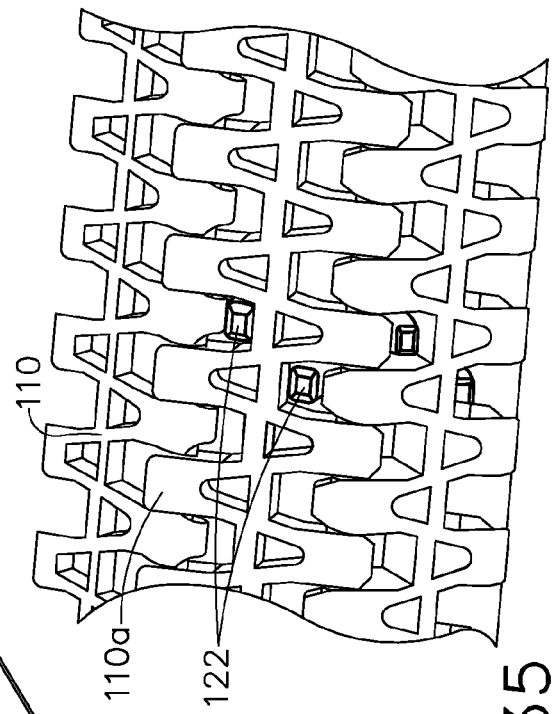
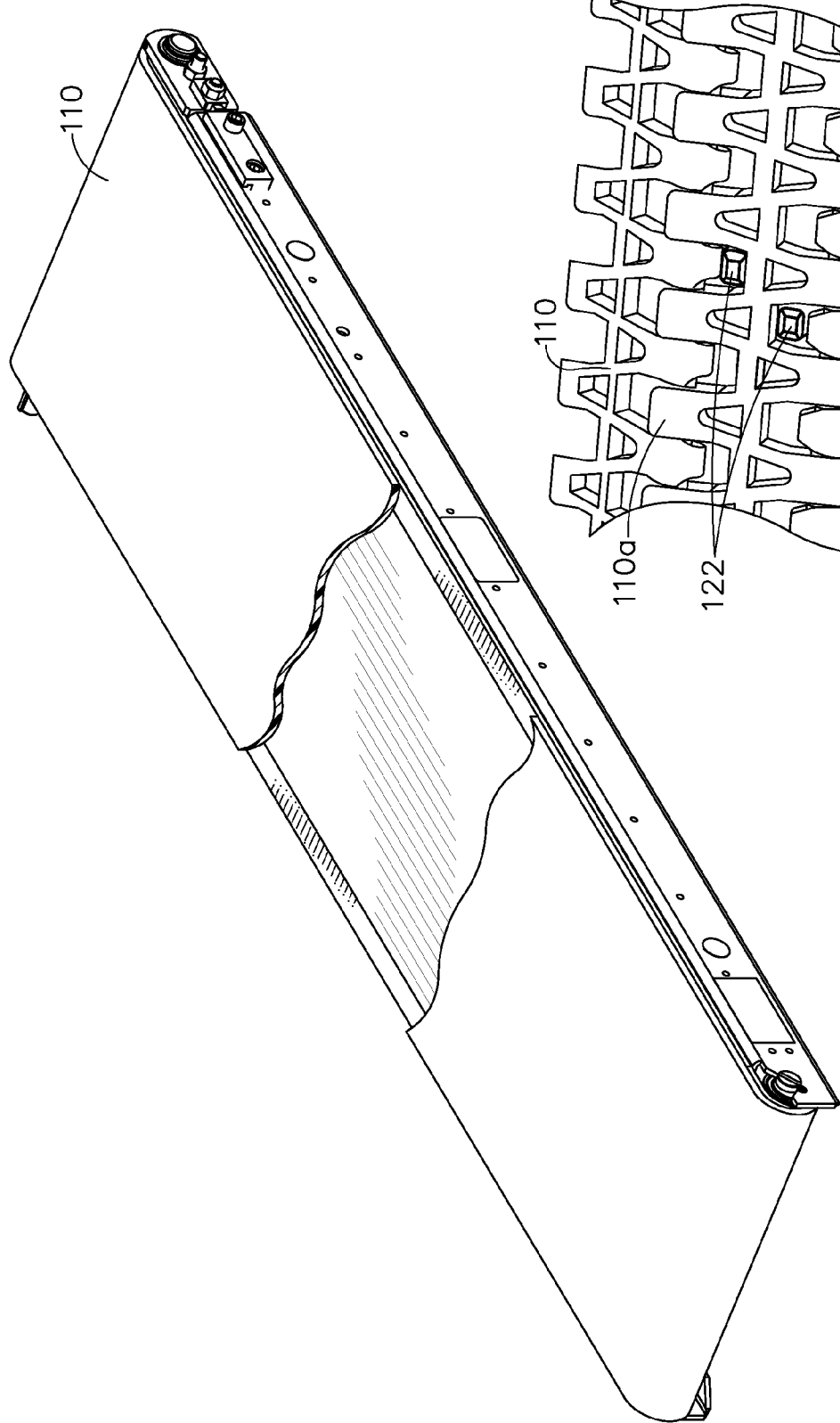
FIG. 34
FIG. 35

METHOD AND APPARATUS FOR FORMING CARBON DIOXIDE PARTICLES INTO BLOCKS

BACKGROUND OF THE INVENTION

The present invention relates to forming solid blocks of a cryogenic material, and is particularly directed to a method and apparatus for forming carbon dioxide particles into blocks.

Carbon dioxide has many uses in its various phases. Solid carbon dioxide has long been used to maintain items, such as food or beverages at desirable cool temperatures. In certain food service applications, solid blocks, or cakes, of carbon dioxide have been used, disposed within an given volume adjacent the items sought to be maintained at or below a desired temperature.

The airline industry is an example of this use of carbon dioxide blocks, wherein carbon dioxide blocks of a preselected size are disposed within one or more compartments of the food carts, thereby keeping the food served to air passengers at or below the desired temperature. In order to meet such need for carbon dioxide blocks, it is known to cut carbon dioxide blocks of the desired size from larger blocks as well as to form the desired sized blocks from carbon dioxide particles. There is a need for flexibility to be able to provide different sized blocks matched to the specific compartment sizes.

The present invention provides a method and apparatus device for forming particles into blocks which produces accurately sized blocks and which allows the size of the blocks to be changed with minimal down time. Although the present invention will be described herein in connection with carbon dioxide, it will be understood that the present invention is not limited in use or application to carbon dioxide.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 34 is a perspective view of the conveyor belt assembly.

FIG. 35 is an enlarged fragmentary view of the conveyor belt engaged by a drive sprocket.

Figure 1:
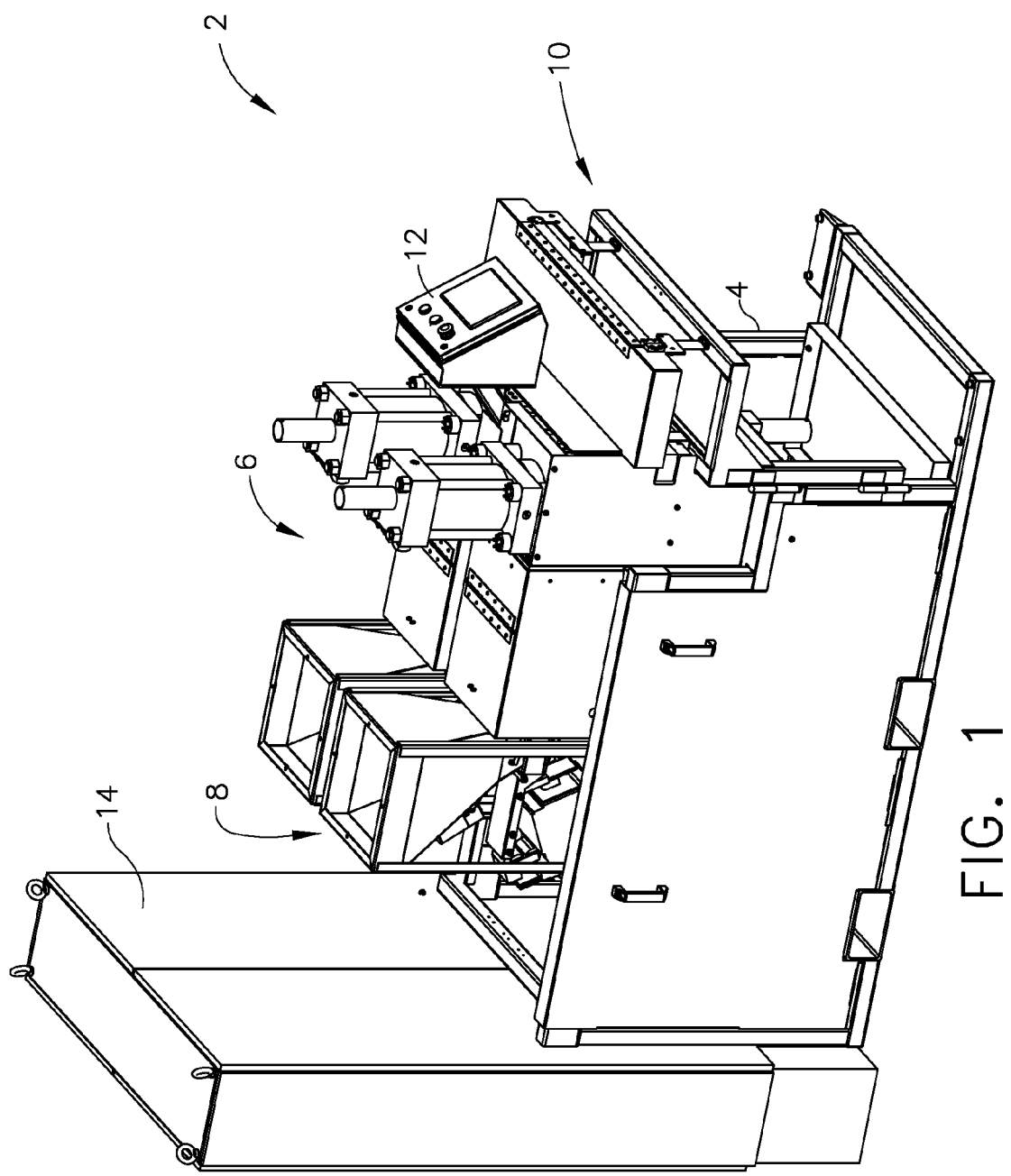
FIG. 1 is a perspective view of a block former constructed in accordance with teachings of the present invention.

Reference will now be made in detail to the present preferred embodiment of the invention, an example of which is illustrated in the accompanying drawings.

DETAILED DESCRIPTION OF AN EMBODIMENT OF THE INVENTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Figure 2:
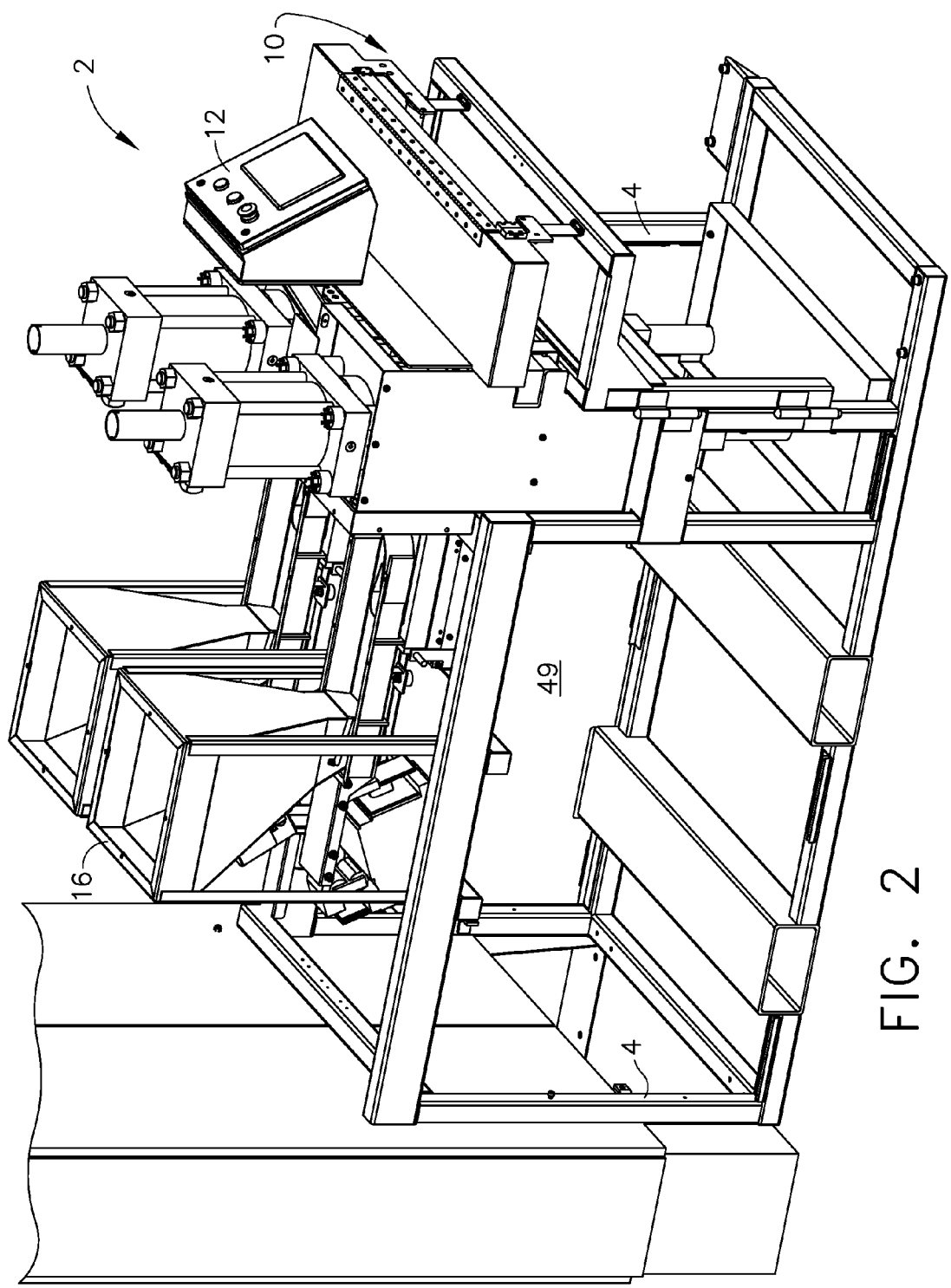
FIG. 2 is a perspective view of the block former of FIG. 2 with certain components omitted for clarity.

Referring to FIGS. 1 and 2, there is shown an apparatus, indicated generally at 2 for forming carbon dioxide blocks, also referred to herein as a former or reformer. Former 2 includes frame 4 which supports the former's components and includes an enclosure (not completely shown). Former 2 includes two forming lines, generally indicated at 6 and 8, although former 2 may have one or more than two forming lines. Former 2 includes conveyor assembly 10, human machine interface (HMI) 12 and enclosure 14 for housing power and control components. Not illustrated is the hydraulic fluid supply system which provides a source of pressurized hydraulic fluid, preferably food grade, for the hydraulic cylinders of the former 2. The hydraulic fluid source may be carried by frame 4, such as in space 4a, or mounted remote to former 2.

Although the size of the components of both forming lines 6 and 8 may differ, the component functions and processes of each line are the same. Thus, only line 8 will be discussed herein in detail.

Figure 3:
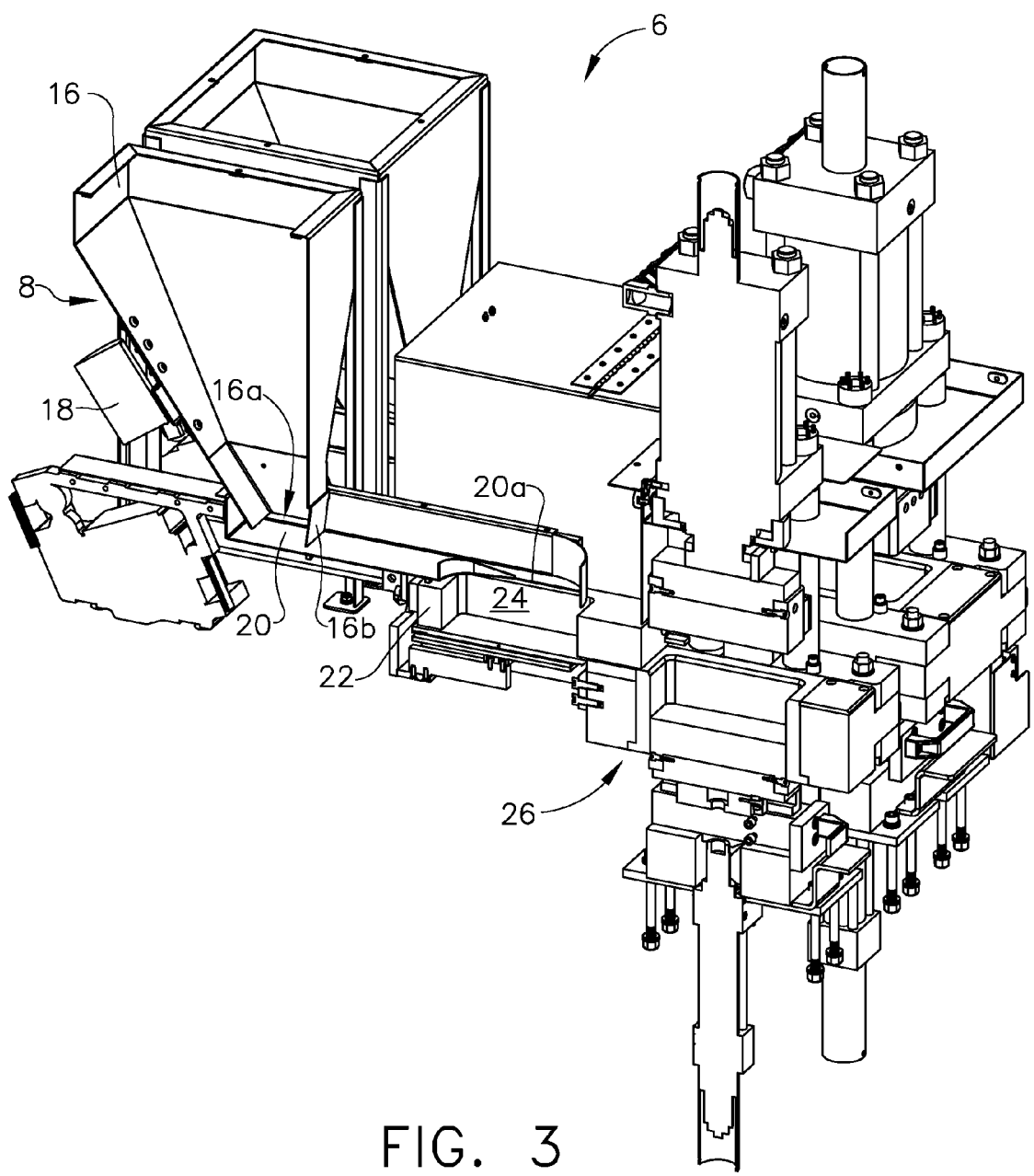
FIG. 3 is a side cross-sectional perspective view of the block former of FIG. 2 taken along the midline of one of the forming lines.

Referring also to FIG. 3, forming line 8 includes hopper 16 configured to receive particles, in this embodiment, carbon dioxide particles. In one embodiment, the lengths of the particles are less than about 0.5 inches. Vibrator 18 is carried by hopper 16. Any suitable device promote the flow of particles downwardly toward and out exit 16a of hopper 16 may be used. Exit 16a overlies dispensing tray 20, and includes door 16b to control the flow of particles from hopper 16 to tray 20. Dispensing tray 20 includes opening 20a (see also FIG. 4) which overlies dosing shuttle 22 and dosing cavity 24, with a small gap therebetween, about 0.5 to 1 inch.

Forming line 8 also includes forming assembly 26, which will be discussed in more detail below.

Figure 4:
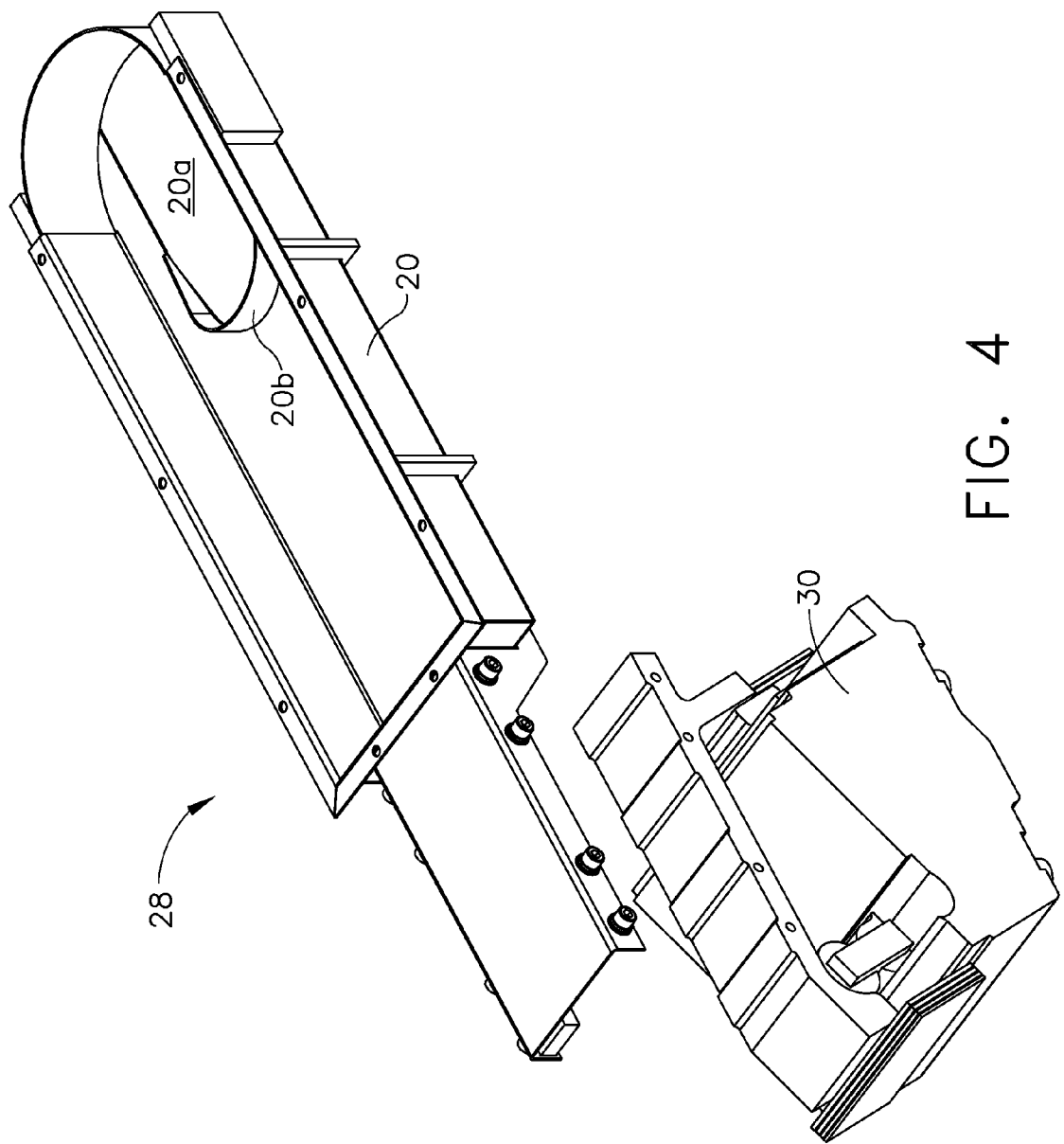
FIG. 4 is perspective view of components of the vibrating tray assembly of the former of FIG. 1.

Referring to FIG. 4, dispensing assembly 28 is illustrated as comprising dispensing tray 20 which is mounted to vibrator 30 (FIG. 4 illustrated tray 20 exploded from vibrator 30). Vibrator 30 is carried by frame 4, and functions to vibrate tray 20 so as to advance particles toward opening 20a. Vibrator 30 may be any of any suitable construction, such as may be well known. In the embodiment depicted, vibrator 30 was manufactured by Eriez. Tray 20 includes diverter 20b configured to direct particles there around so as to be introduced into dosing cavity 24 from the sides of opening 20a, to promote uniform distribution of particles in dosing cavity 24.

Figure 5:
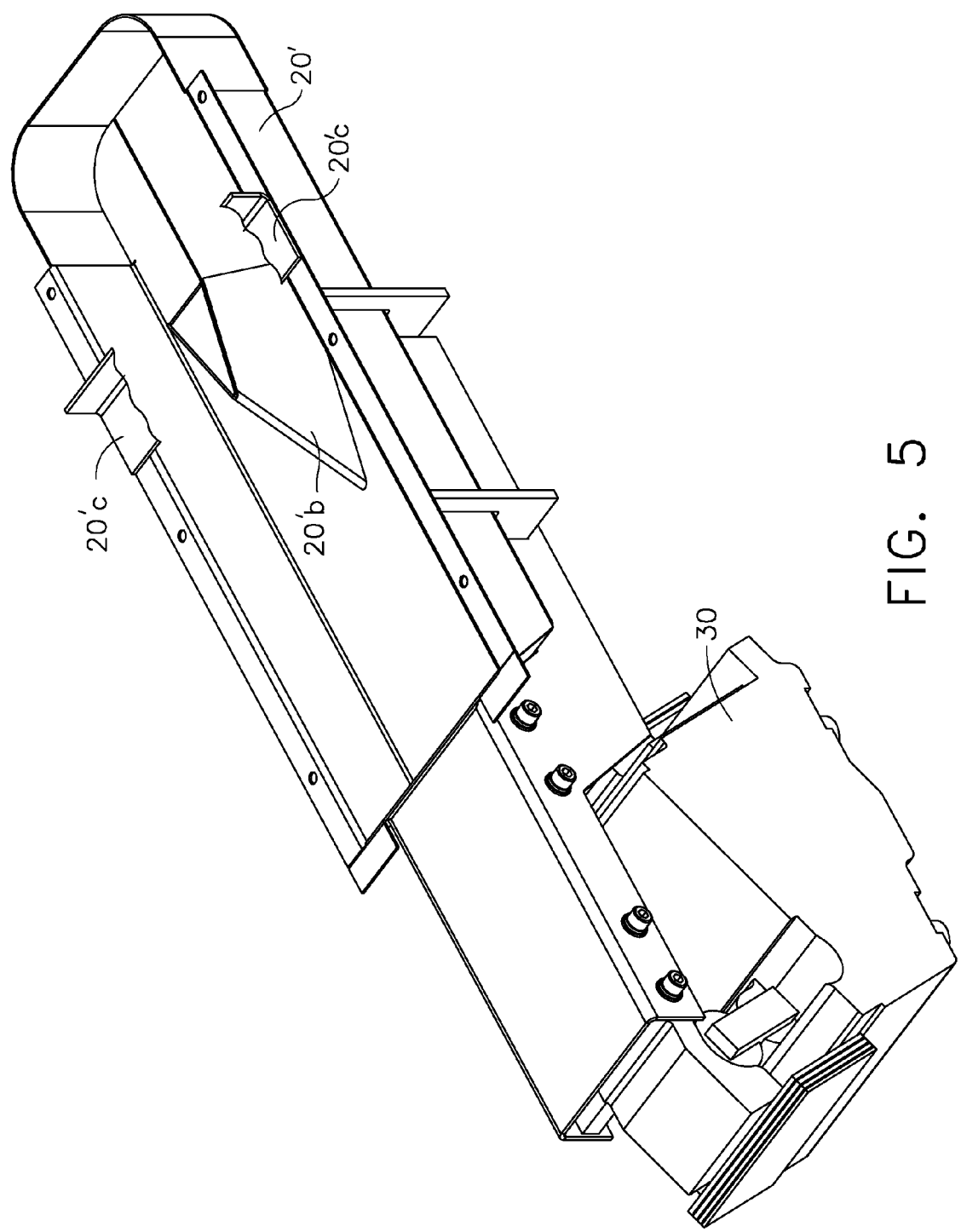
FIG. 5 is a perspective view of an alternate embodiment of the vibrating tray.

FIG. 5 is a perspective view of an alternate vibrating tray embodiment, identified as 20', having a different shaped diverter 20'b. FIG. 5 illustrates a fragmentary support bracket 20'c for structural support to tray 20'.

Figure 6:
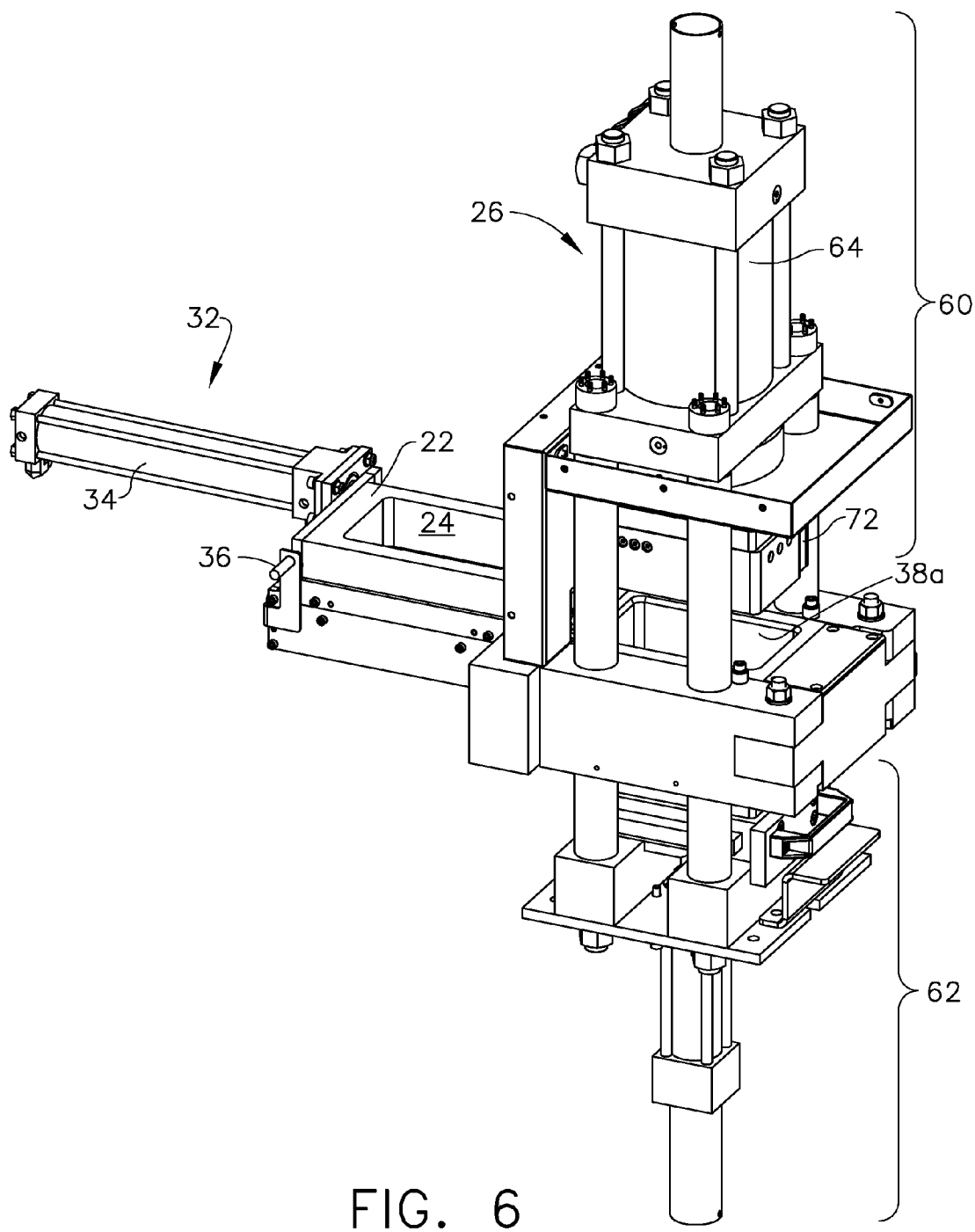
FIG. 6 is a perspective view of the left dosing shuttle and forming assembly of the former of FIG. 1.
Figure 7:
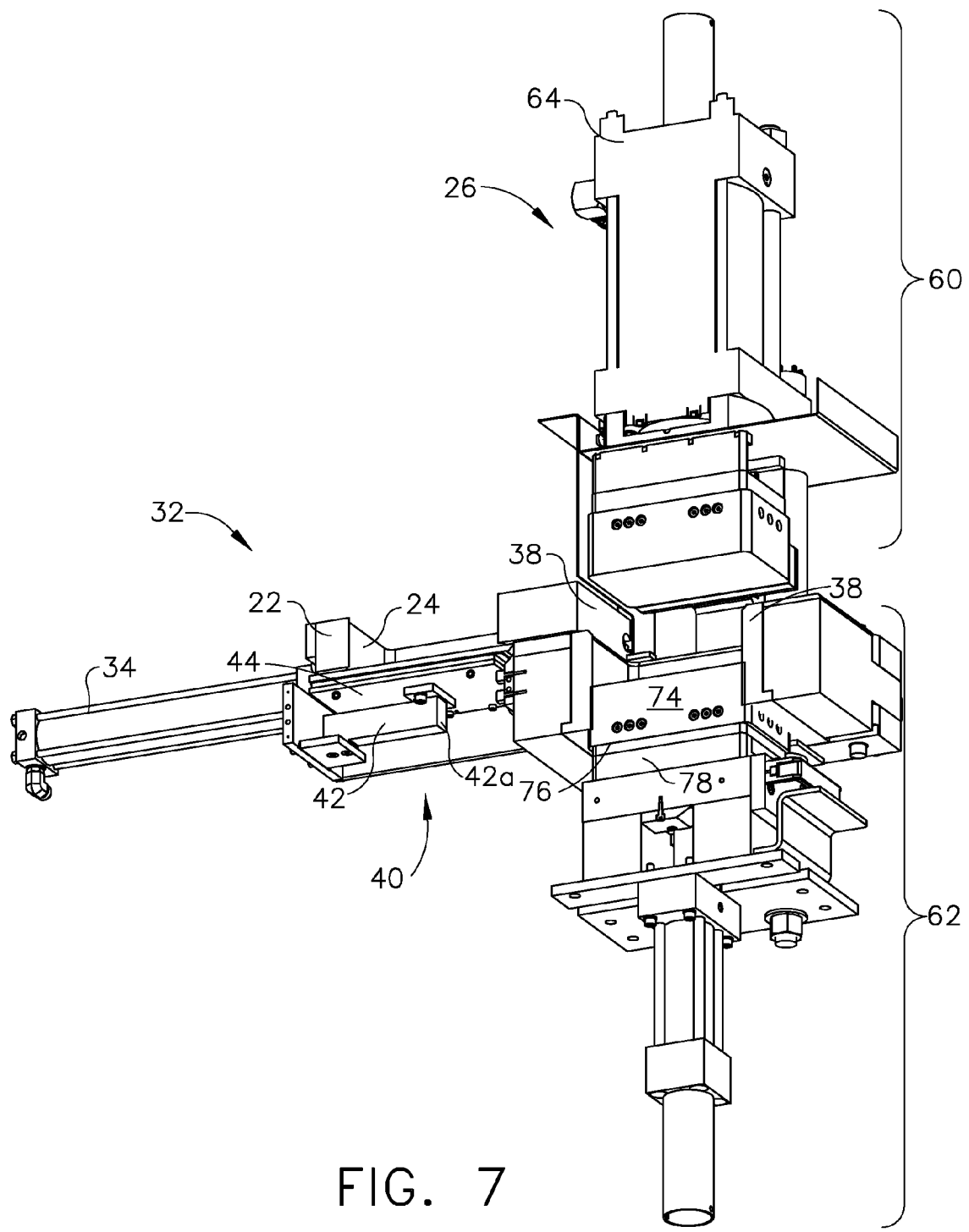
FIG. 7 is a side cross-sectional bottom perspective view of the dosing shuttle and forming assembly shown in FIG. 6. taken along the midline of the dosing shuttle and forming assembly.

Referring to FIGS. 6 and 7, dosing assembly 32 and forming assembly 26 of forming line 8 are shown. Dosing assembly 32 includes hydraulic cylinder 34 for reciprocating dosing shuttle 22 from a first position at which dosing cavity 24 is aligned with opening 20a so that dosing cavity 24 can be charged with particles, and a second position at which dosing cavity is aligned with forming chamber 38a so that forming chamber 38a can be charged with particles discharged from dosing cavity 24, and a third position at which dosing shuttle 22 has pushed a formed block onto the conveyor. Sensor 36 is positioned to sense when dosing shuttle 22 is in the charging position, and another sensor (not seen in FIG. 6) senses when dosing cavity 24 is aligned with forming chamber 38a. Dosing shuttle 22 may be made of any suitable material, such as UHMW.

In this embodiment depicted, the amount particles dispensed into dosing cavity 24 is determined by the weight of the particles within dosing cavity 24. In FIG. 7, weighing system 40 can be seen comprising load cell 42 cantilevered at one end, and supporting and locating weighing platform 44 at distal end 42a. Referring also to FIGS. 8-12a, which depict an alternate embodiment of load cell 42', cantilevered from the lateral side instead of the longitudinal side, weighing platform 44 includes upper plate 46 made of stainless steel in the depicted embodiment. The lower surface of upper plate 46 includes cavities (not shown) into which a pair of heaters 48 extend. Each heater includes a downwardly depending projection 48a (FIG. 12a) that extends into openings 50a formed in intermediate plate 50 of weighing platform 44. Thermocouple 52 is embedded in the bottom surface of upper plate 46. Ceramic heater 52 is also disposed adjacent or embedded into the lower surface of upper plate 46, disposed to prevent particles from freezing at that end of the weighing platform (it being noted that shuttle 22 moves relative to weighing platform 44. A pair of air knives 58 are disposed at the end of dosing assembly 32 adjacent the forming assembly 26, which are connected to a source of pressurized air, such as shop air, to reduce the chance of agglomerating particles at that location.

When the signal from load cell 42 indicates the desired weight of particles are present within dosing cavity 42, the system controller stops the flow of particles into dosing cavity 42 by stopping the vibration of dispensing tray 20. When the desired weight of particles are present, the shuttle is controlled to charge forming chamber 38a.

Figure 9:
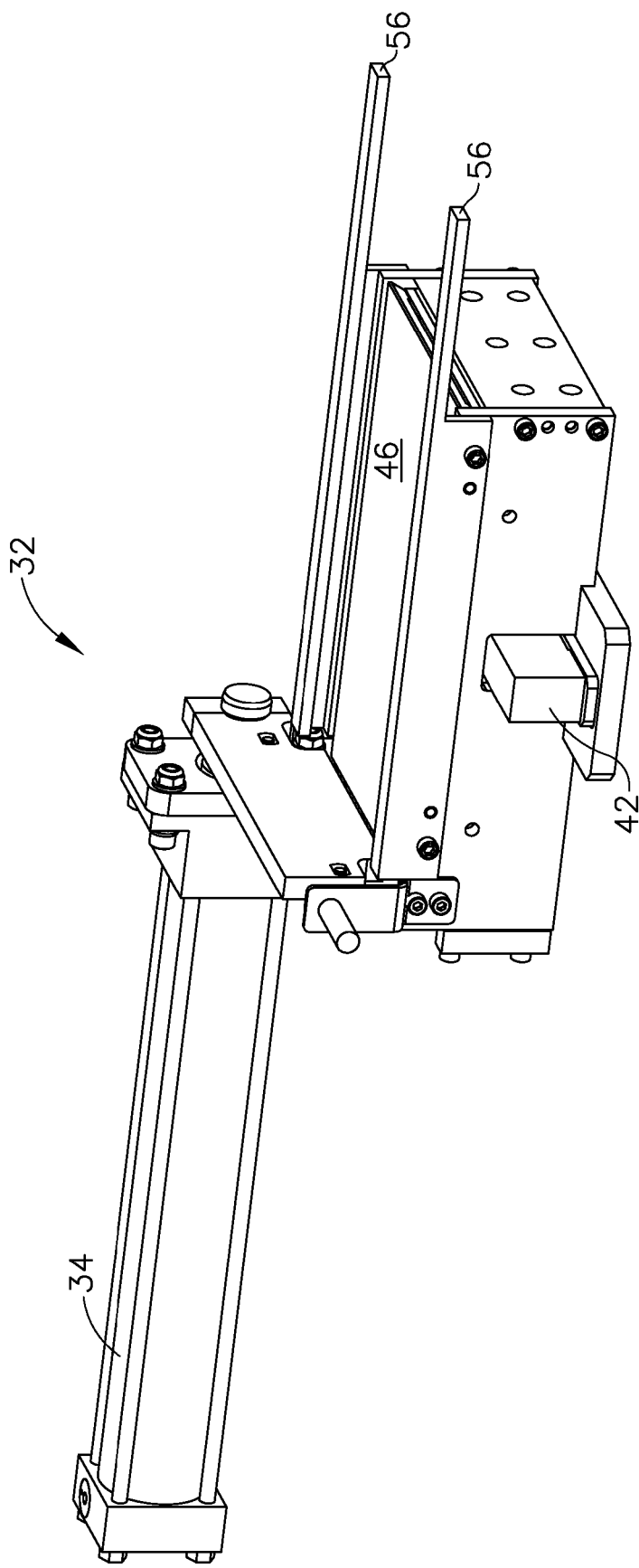
FIG. 9 is a side perspective view showing the dosing shuttle assembly with the dosing shuttle hydraulic omitted for clarity.
Figure 10:
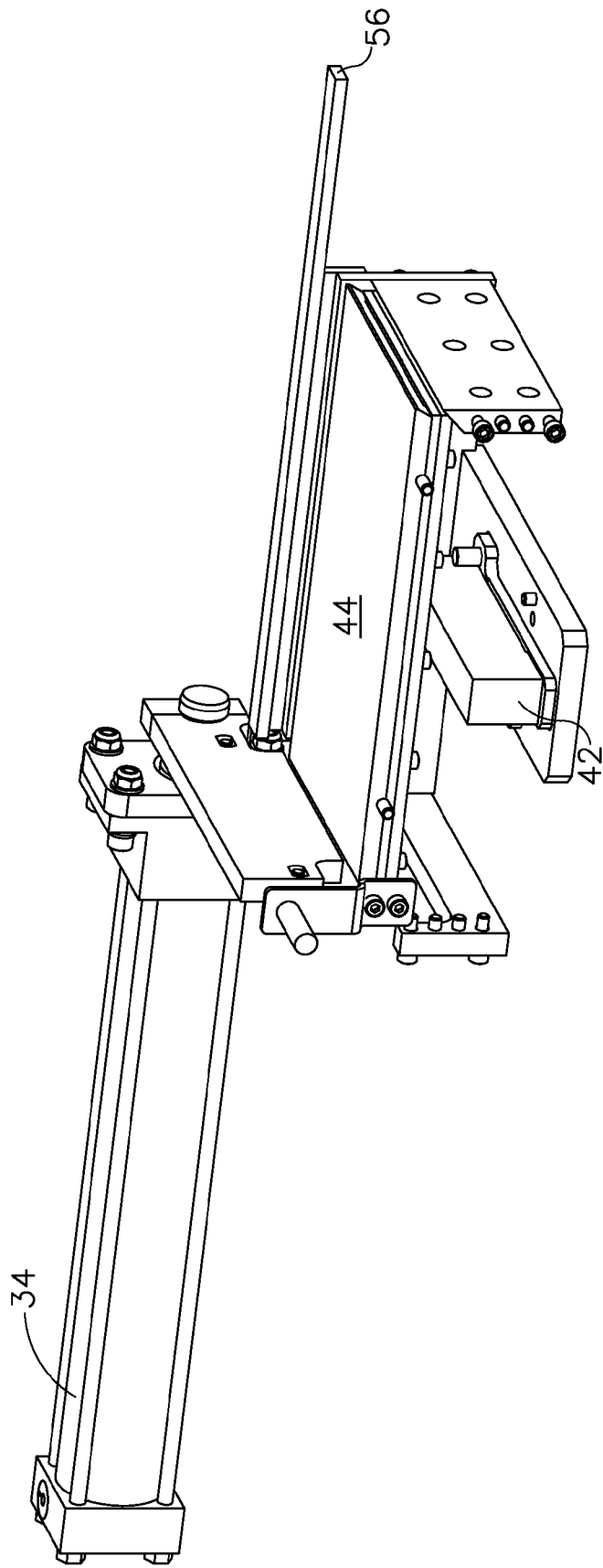
FIG. 10 is a side perspective view similar to FIG. 9 with a shuttle guide and a lower plate omitted for clarity.
Figure 11:
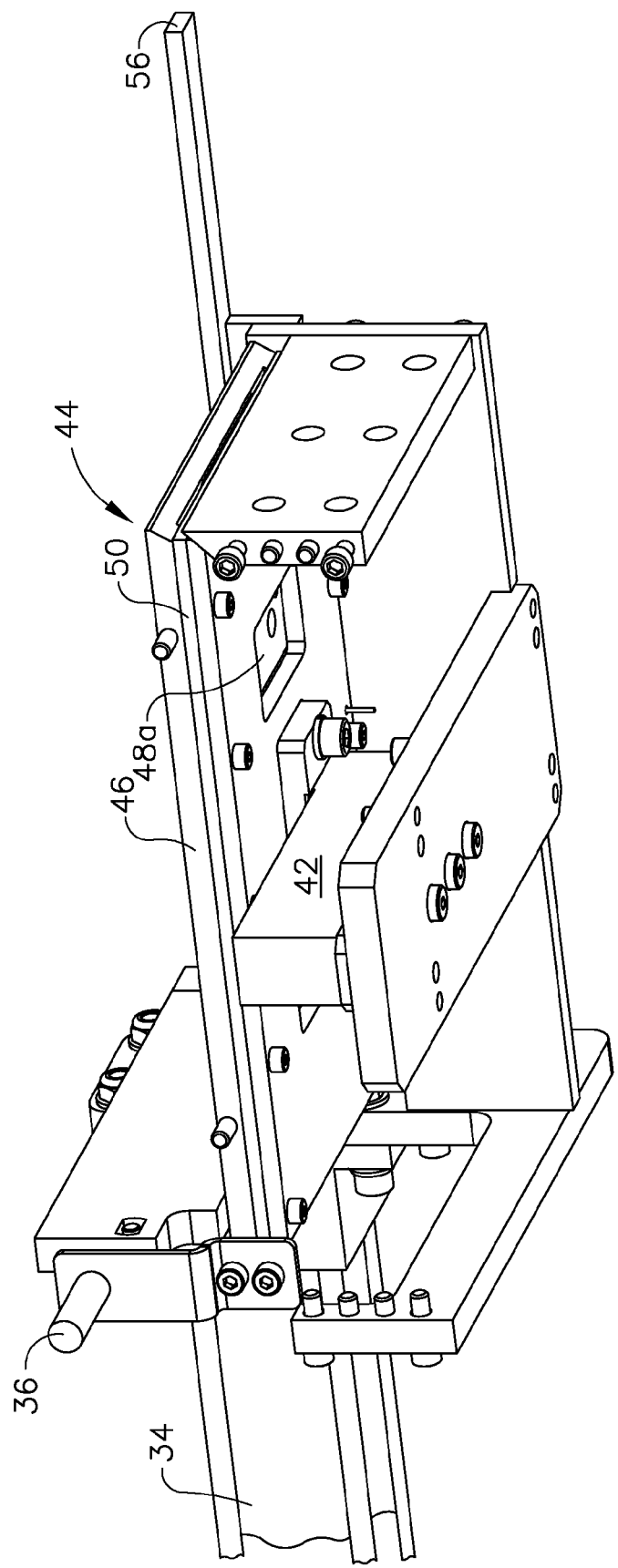
FIG. 11 is a bottom side perspective view of the dosing shuttle assembly shown in FIG. 10.
Figure 12:
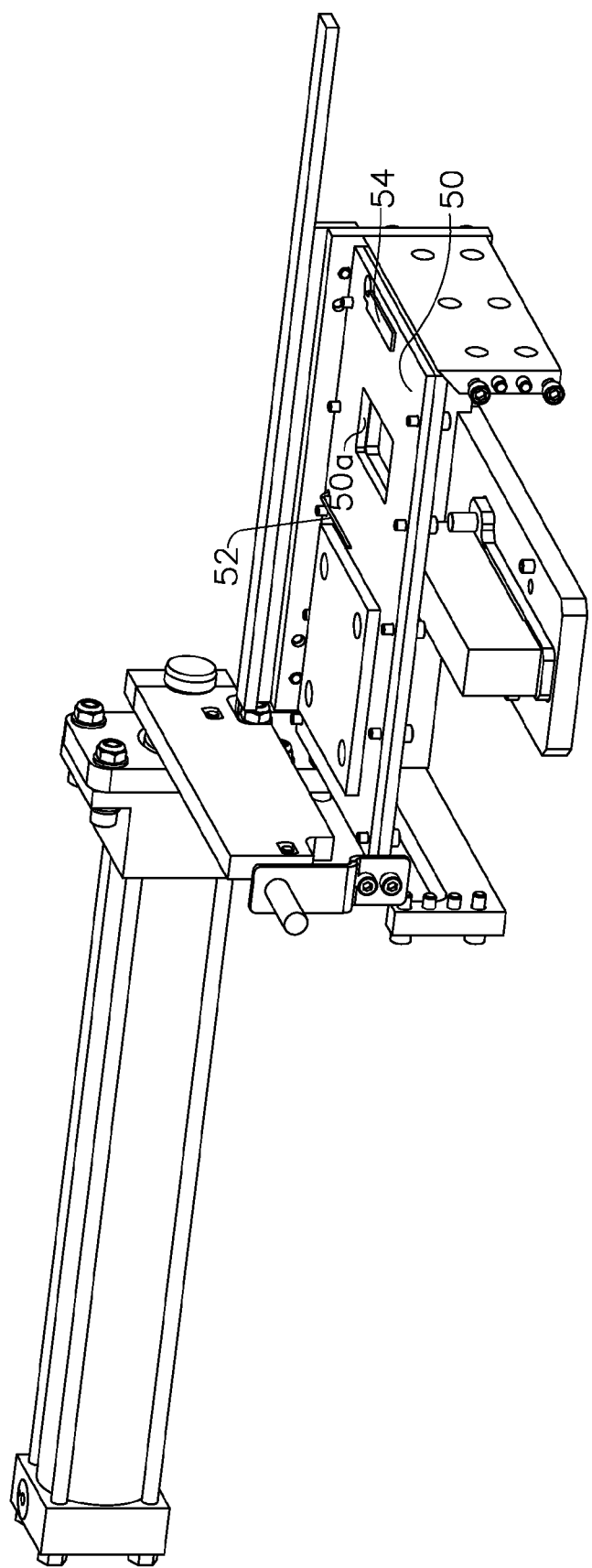
FIG. 12 is a side perspective view similar to FIG. 10 with the weighing plate omitted for clarity.
Figure 12A:
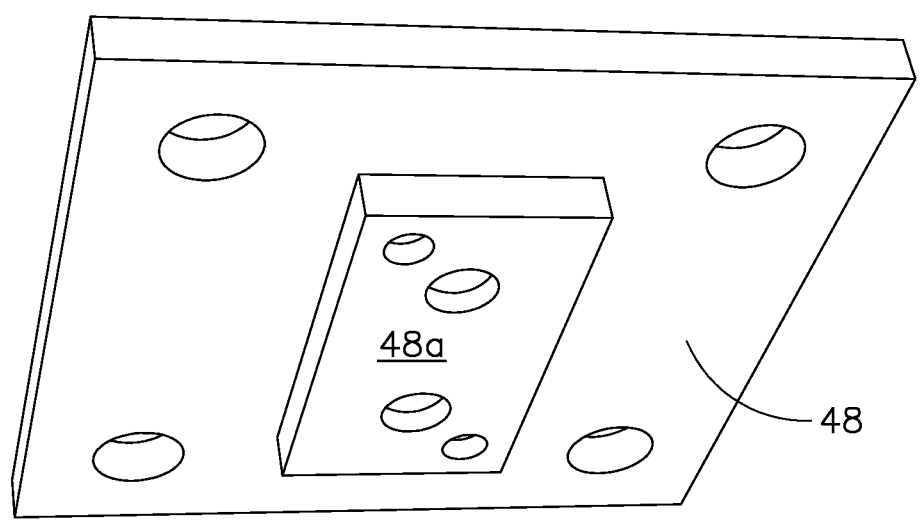
FIG. 12A is bottom perspective view of a heater.

As seen in FIG. 9, a pair of spaced apart guide rails 56 are supported by the dosing assembly. Guide rails 56 guide dosing shuttle 22 so as to maintain the appropriate position relative to the other components. In the embodiment depicted, guide rails 56 are illustrated as having a combined rectangular and T cross section. Guide rails 56 may be of any suitable cross sectional shape and length so as to maintain dosing shuttle 22 in the appropriate position relative to the other components.

Figure 8:
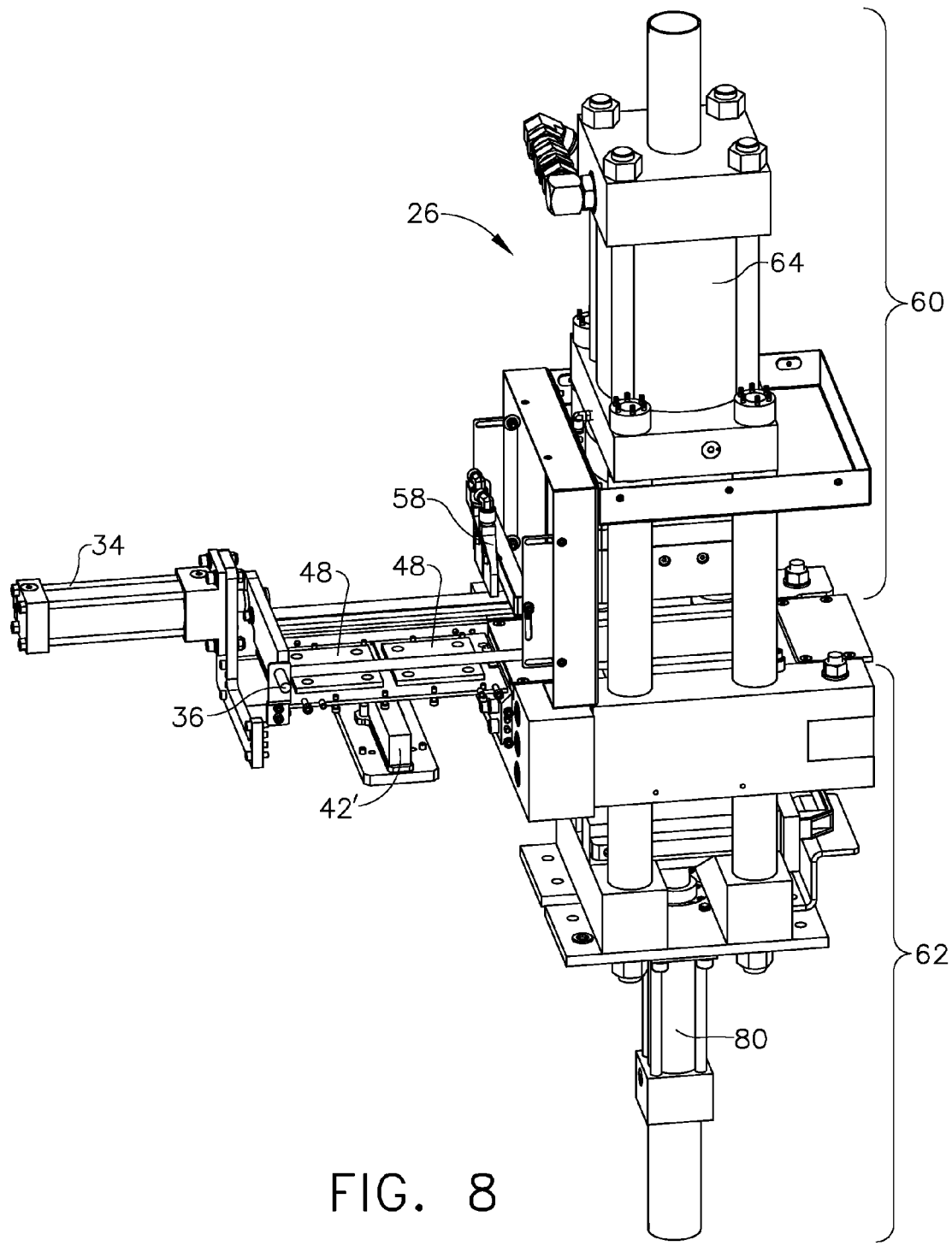
FIG. 8 is a side perspective view of the forming assembly of FIG. 6, with an alternate embodiment of the weighing structure and the dosing shuttle omitted for clarity.
Figure 13:
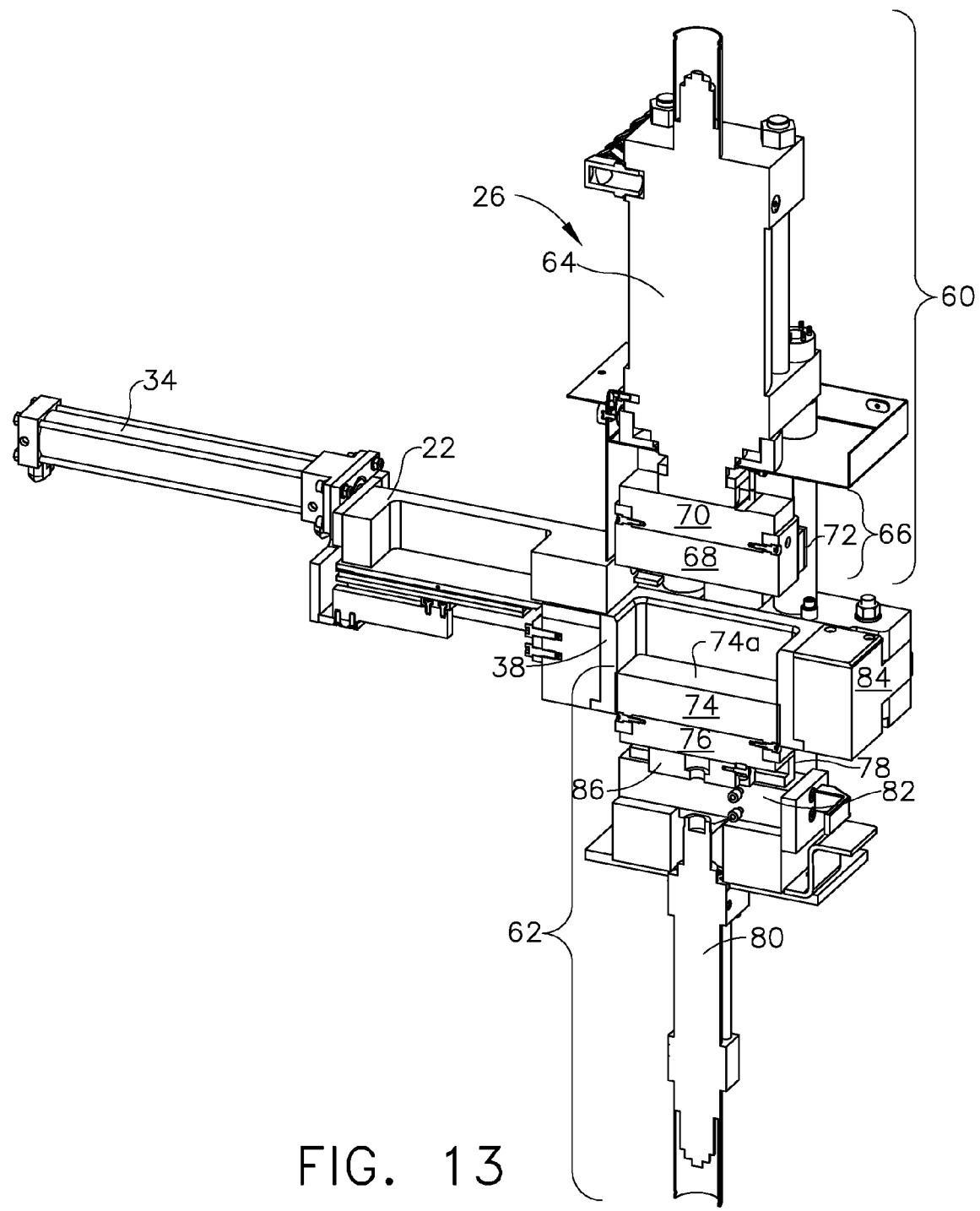
FIG. 13 is a cross-sectional top perspective view of the dosing shuttle and forming assembly similar to FIG. 7.

Included in FIGS. 6, 8 and 13 are illustrations of forming assembly 26. Forming assembly 26 includes piston assembly 60, forming chamber block 38 and eject assembly 62. Piston assembly 60 includes press hydraulic cylinder 64 and press piston assembly 66 attached thereto. Press piston assembly includes press piston 68 which is attached to press piston block 70, disposed in the retracted position high enough to allow dosing shuttle 22 to travel between its first position and its second and third positions (described above). Press piston 68 may be made of any suitable material, such as UHMW. As can be seen in the cross-section of FIG. 13, the lower relieved portion of press piston block 70 extends into a recess formed in the upper surface of press piston 68 such that the two components are secured together by fasteners.

The orientation and location of press piston 68 is maintained by press piston guide 72. Press piston 68 is maintained in alignment with forming chamber 38a. The upper edges of forming chamber 38a are chamfered to provide a lead in for press piston 68 so that it can enter forming chamber 38a without interfering with the upper edges of forming chamber 38a, and proceed to compress carbon dioxide particles into blocks, as described below. Adequate clearance between press piston 66 and the walls of forming chamber 38a is provided, which in the embodiment depicted is about 0.020 to 0.030 inches on a side.

Eject assembly 62 includes eject piston 74, formed of any suitable material such as UHMW and which is attached to eject piston block 76 in the same manner as press piston 68 and press piston block 70. Eject piston block 76 is mounted to eject piston mounting slide 78 which is releasably connected to eject hydraulic cylinder 80. Spacer 82 is disposed beneath eject piston mounting slide 78, supported vertically on its lower side, establishing the position of the upper surface 74a of eject piston 74 within forming chamber 38a. During formation of blocks, as described below, spacer 82 functions as the reaction member to the force exerted by press piston 68, through the carbon dioxide particles, through eject piston 74, and through eject piston block 76. With this construction, lower eject hydraulic cylinder 80 does is not sized to oppose the force of press hydraulic cylinder 64, but only sized to lift eject piston 74 to eject a formed block.

Figure 14:
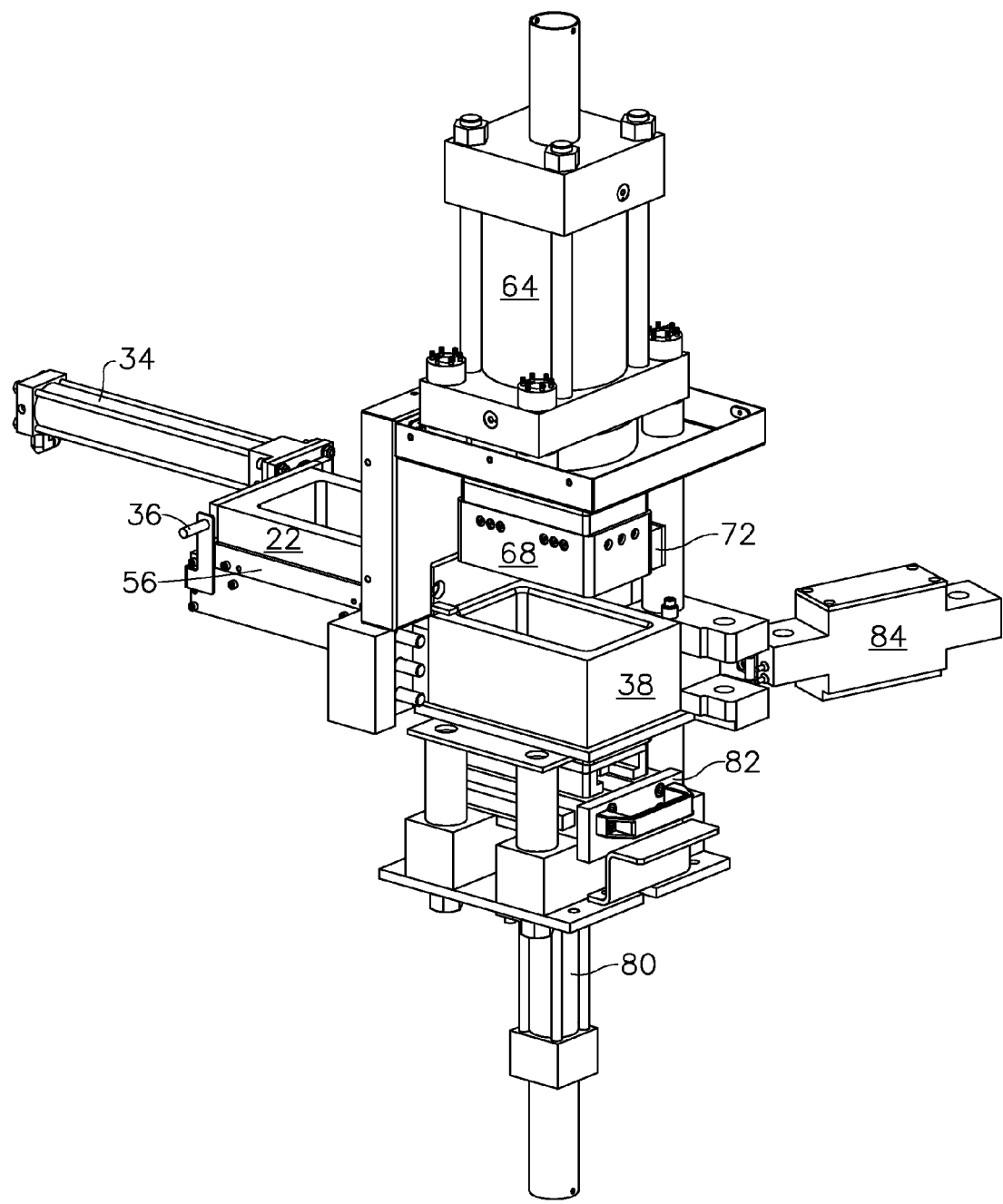
FIGS. 14 and 14A are side perspective views of the dosing shuttle and forming assembly of FIG. 6, with the front block pivoted to the open position.
Figure 14A:
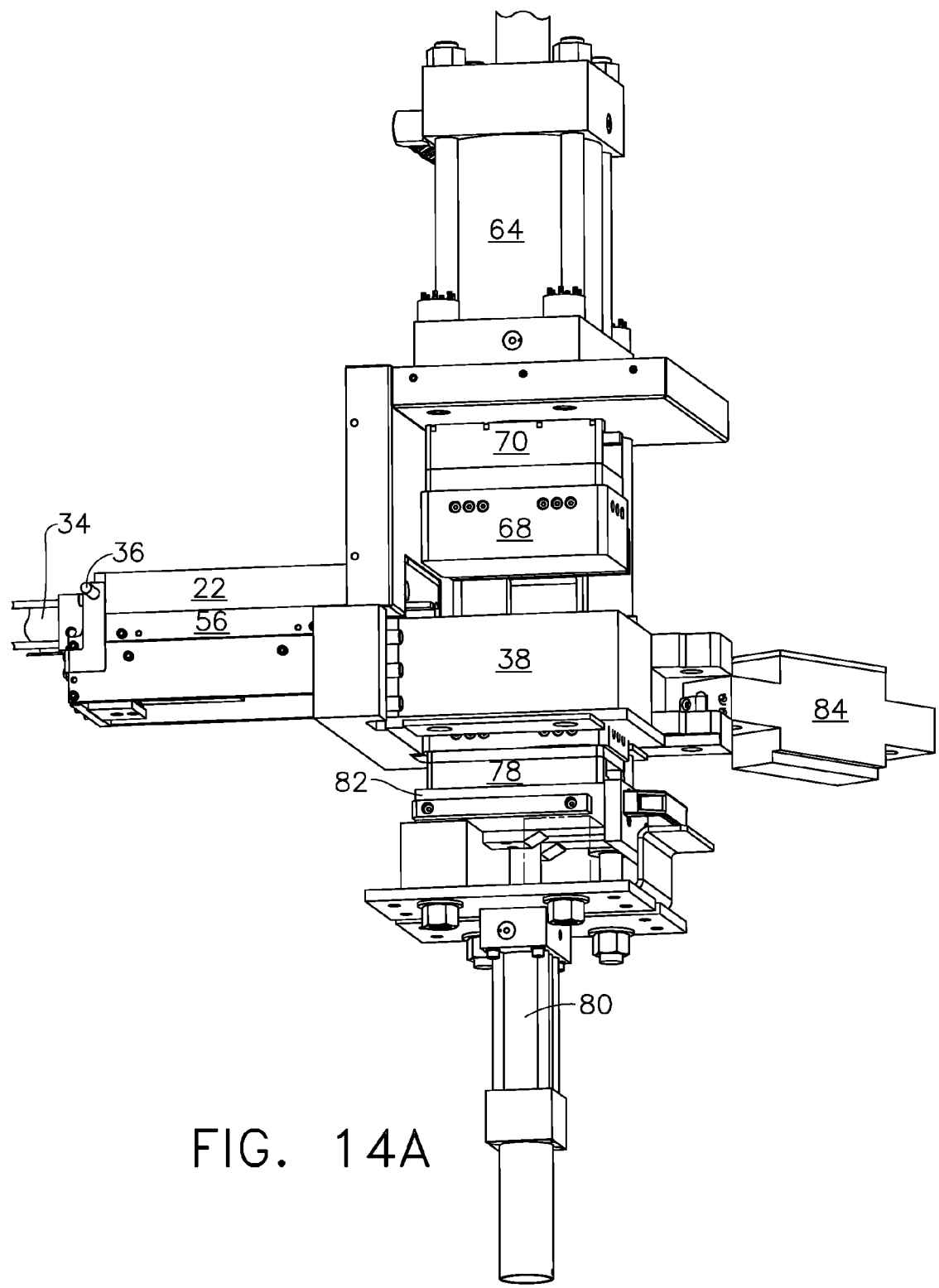

FIGS. 14 and 14A illustrate front block 84 pivoted to its open position, allowing access to forming block 38 for removal, such as to exchange for another size block. Forming block 38 may be of any suitable dimension, such as 210 cm×125 cm or 150 cm×150 cm. The removal and installation of forming block 38 is described below.

Figure 15:
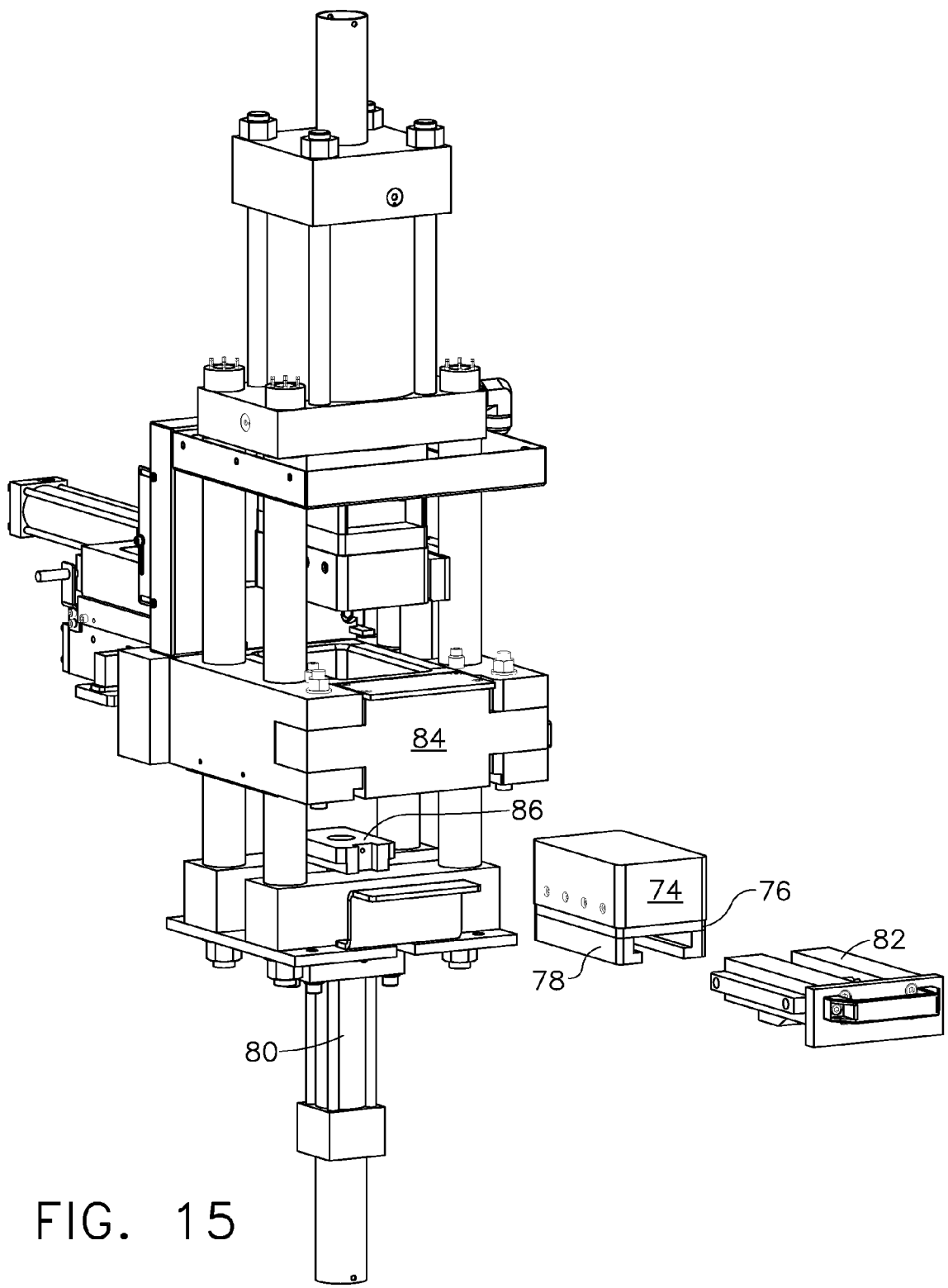
FIG. 15 is a front perspective view of the dosing shuttle and forming assembly of FIG. 6 with the ejection piston and spacer exploded out.

Referring to FIG. 15, eject piston 74 and spacer 82 are illustrated removed from eject assembly 62. As seen in FIG. 15, the upper end of eject hydraulic cylinder 80 carries mount 86 which is configured to slidably receive eject piston mounting slide 78. It is noted that the process for removing eject piston 74, as described below, involves locating eject piston 74 within forming chamber 38a and removing forming block 38 while eject piston 74 is disposed therein.

FIGS. 15-19 illustrate the process for installing spacer 82. The thickness of spacer 82 sets the location of upper surface 74a of eject piston 74, which may be used, at least in certain embodiments, to control the volume of particle disposed into forming chamber 38a, such as when forming chamber 38a is filled completely to its upper edge, thereby controlling the thickness of the formed block. Of course, as described above, when a metered dose is dispensed into dosing chamber 24, such as based on weight, forming chamber does not have to be filled to its upper edge to produce the desired thickness of the formed block.

Figure 16:
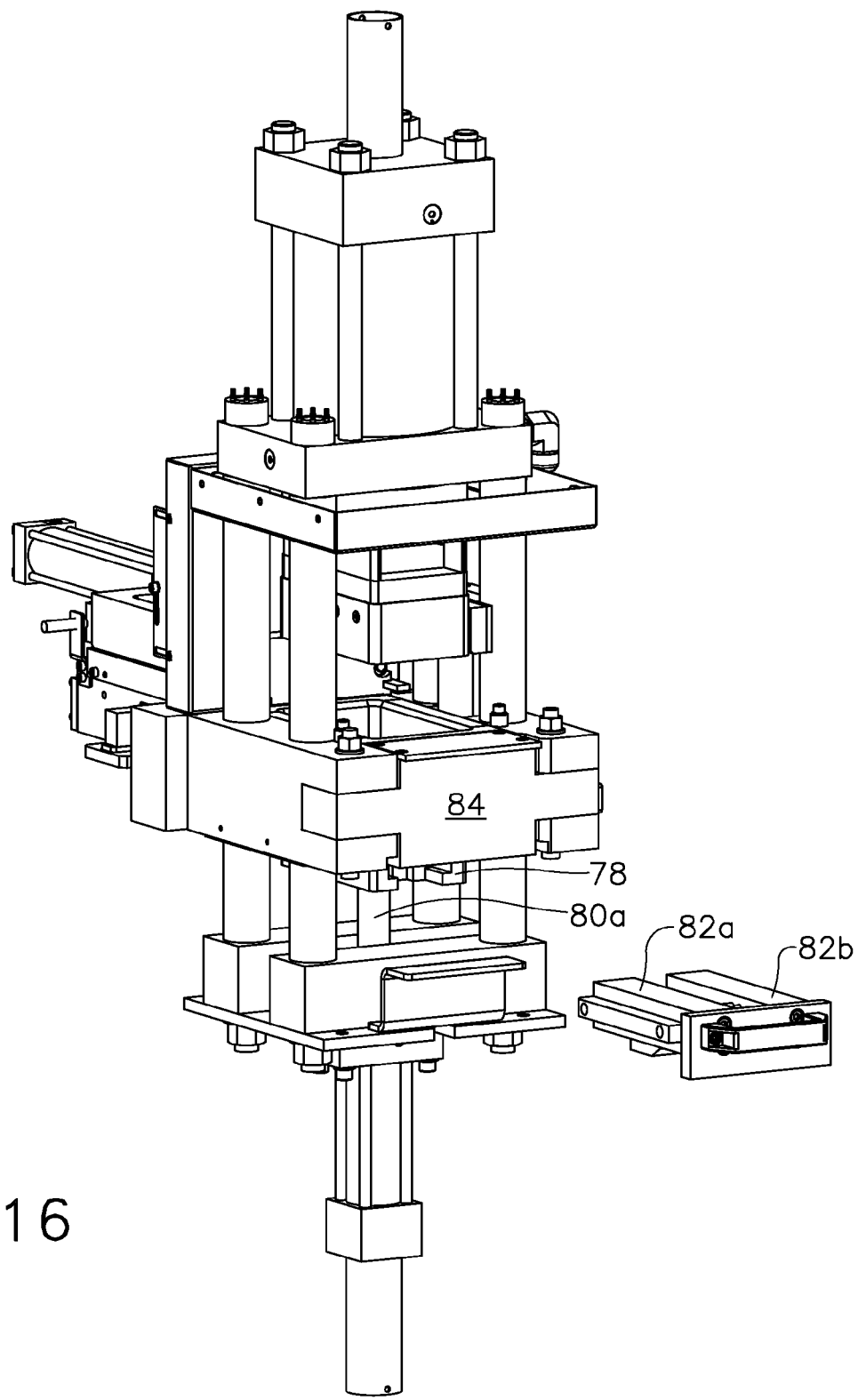
FIG. 16 is a front perspective view of the dosing shuttle and forming assembly of FIG. 6, with the spacer oriented for insertion into the forming assembly.
Figure 17:
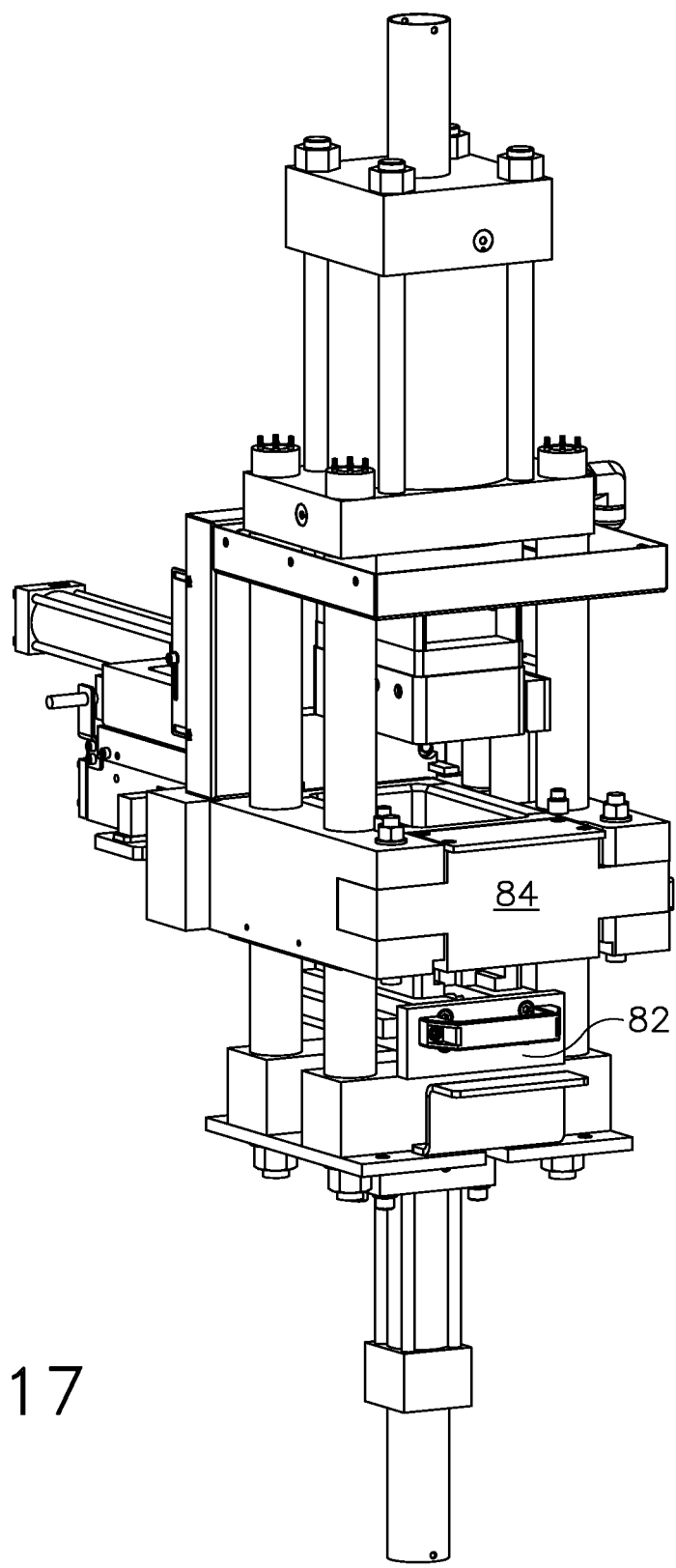
FIG. 17 is a front perspective view similar to FIG. 16, illustrating the spacer being installed under the ejection piston.
Figure 18:
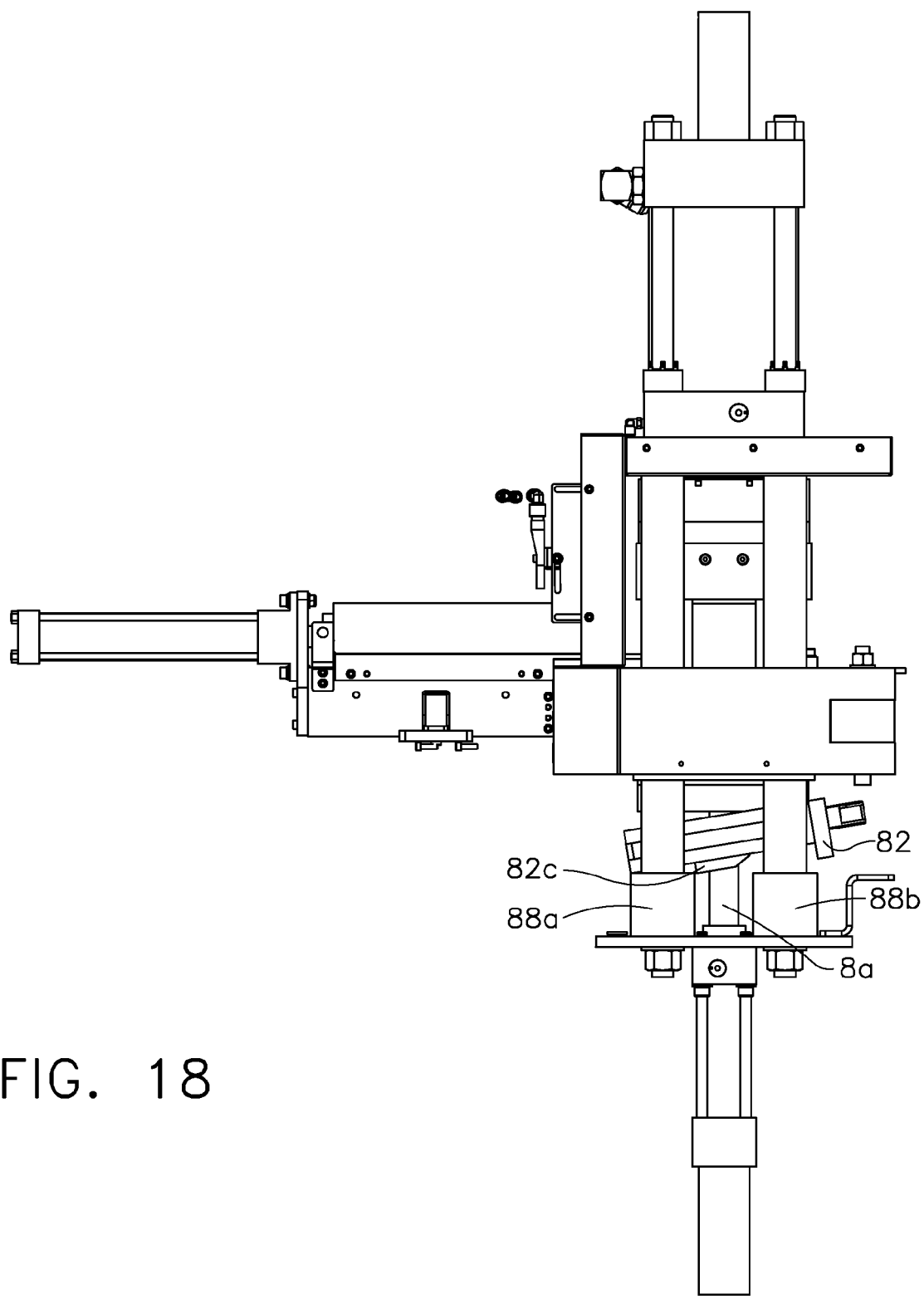
FIG. 18 is a side view of the dosing shuttle and forming assembly of FIG. 6, showing the spacer tilted during installation.
Figure 19:
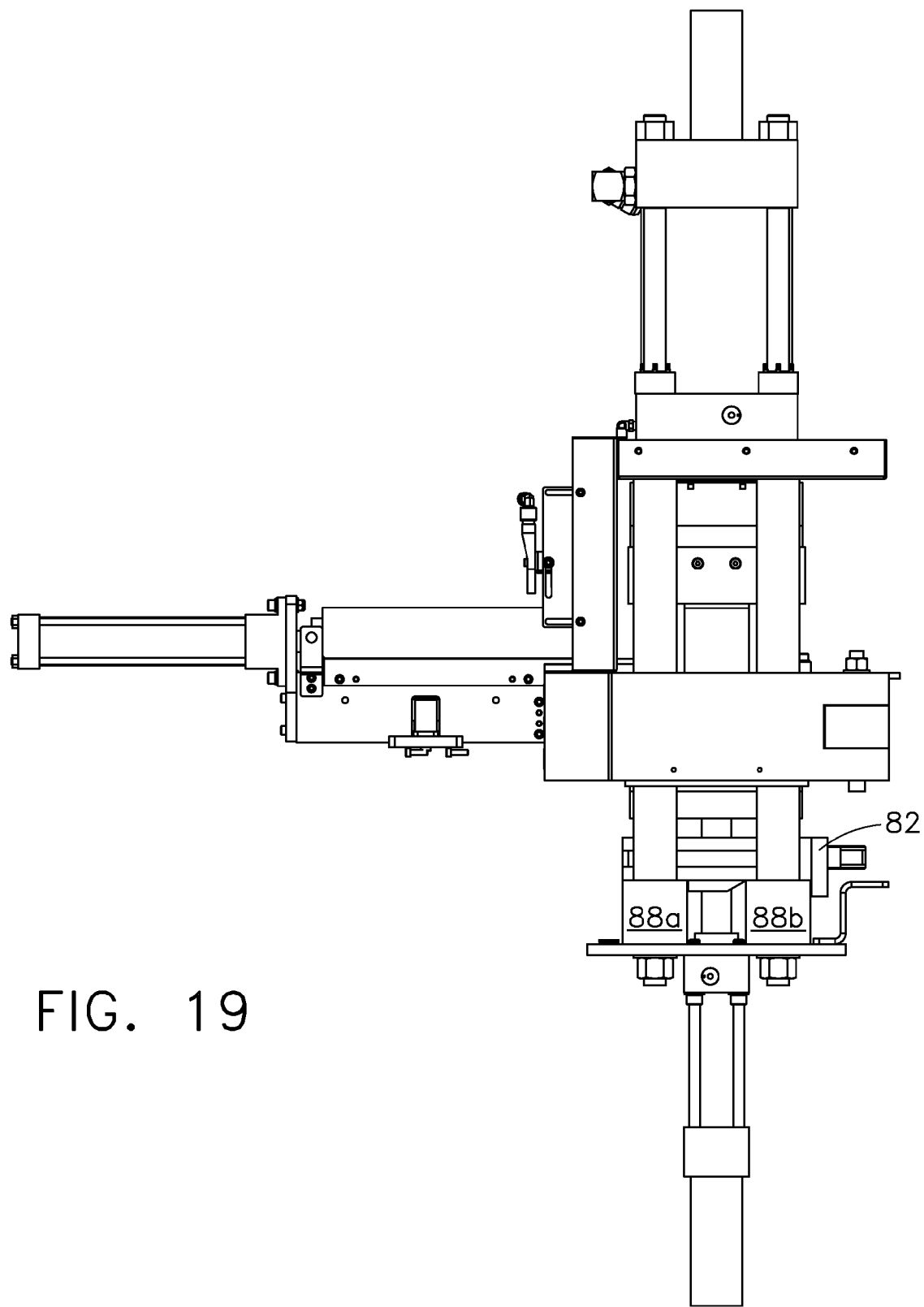
FIG. 19 is a side view of the dosing shuttle and forming assembly of FIG. 6 similar to FIG. 18, showing the spacer installed under the ejection piston.
Figure 20:
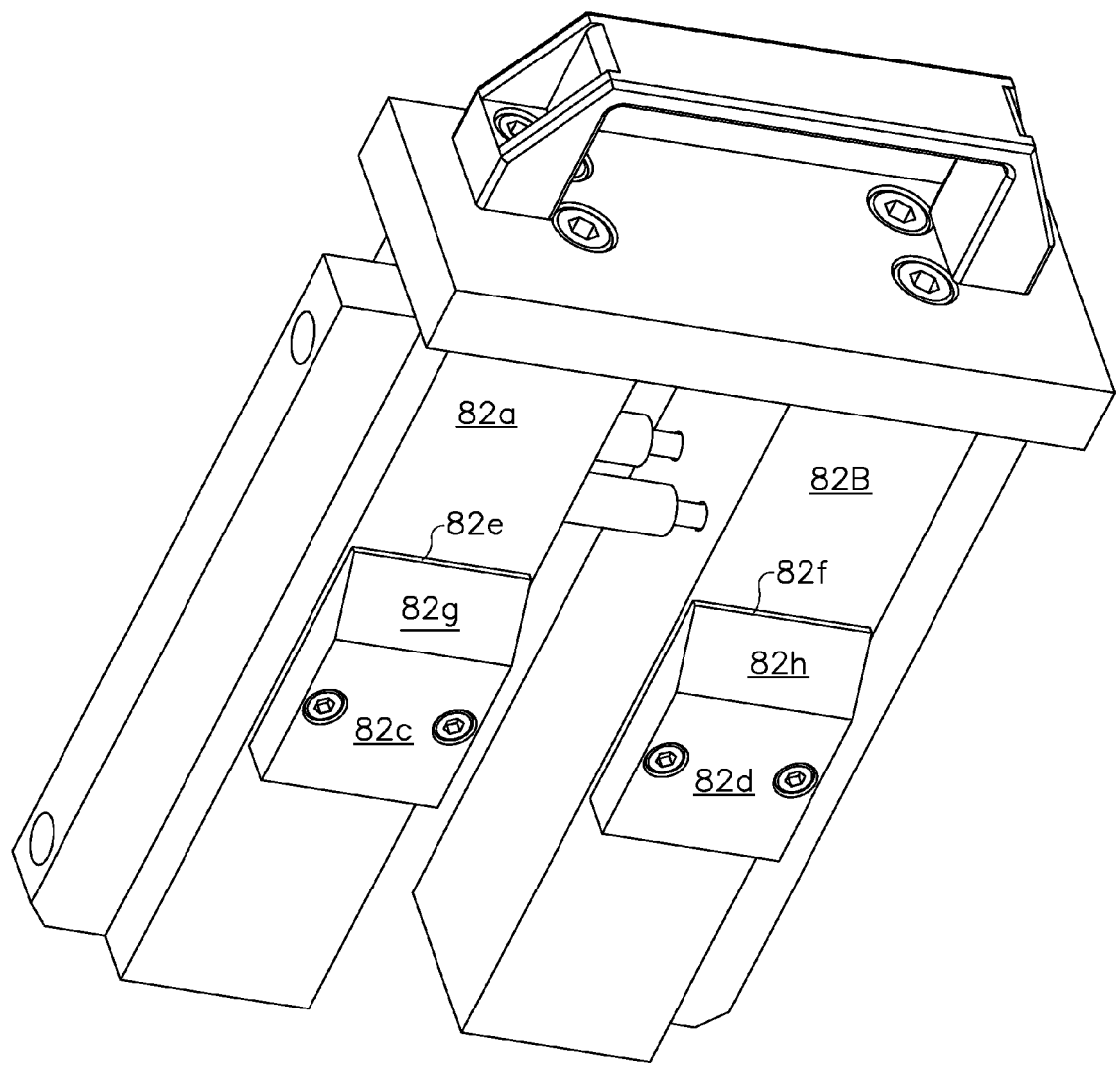
FIG. 20 is an enlarged bottom perspective view of the spacer.

As illustrated by FIG. 16, with eject hydraulic cylinder 80 extended such that eject piston mounting slide 78 is disposed high enough to allow insertion of spacer 82, spacer 82 may be inserted into the space under eject piston mounting slide 78, with the space between spaced apart legs 82a, 82b receiving eject hydraulic cylinder rod 80a, as illustrated in FIG. 17. As it is inserted, spacer 82 is tilted down such that locating pads 82c, 82d (see FIG. 20) align with supports 88a, 88b, such that spacer 82 can be rotated down into its operational position as shown in FIG. 19. The configuration of pads 92c, 82d, including perpendicular lips 82e, 82f at the edge of inclines 82g, 82h, locate spacer 82. Inclines 82g, 82h, help to guide spacer 82 into and out of its operational position.

Figure 21:
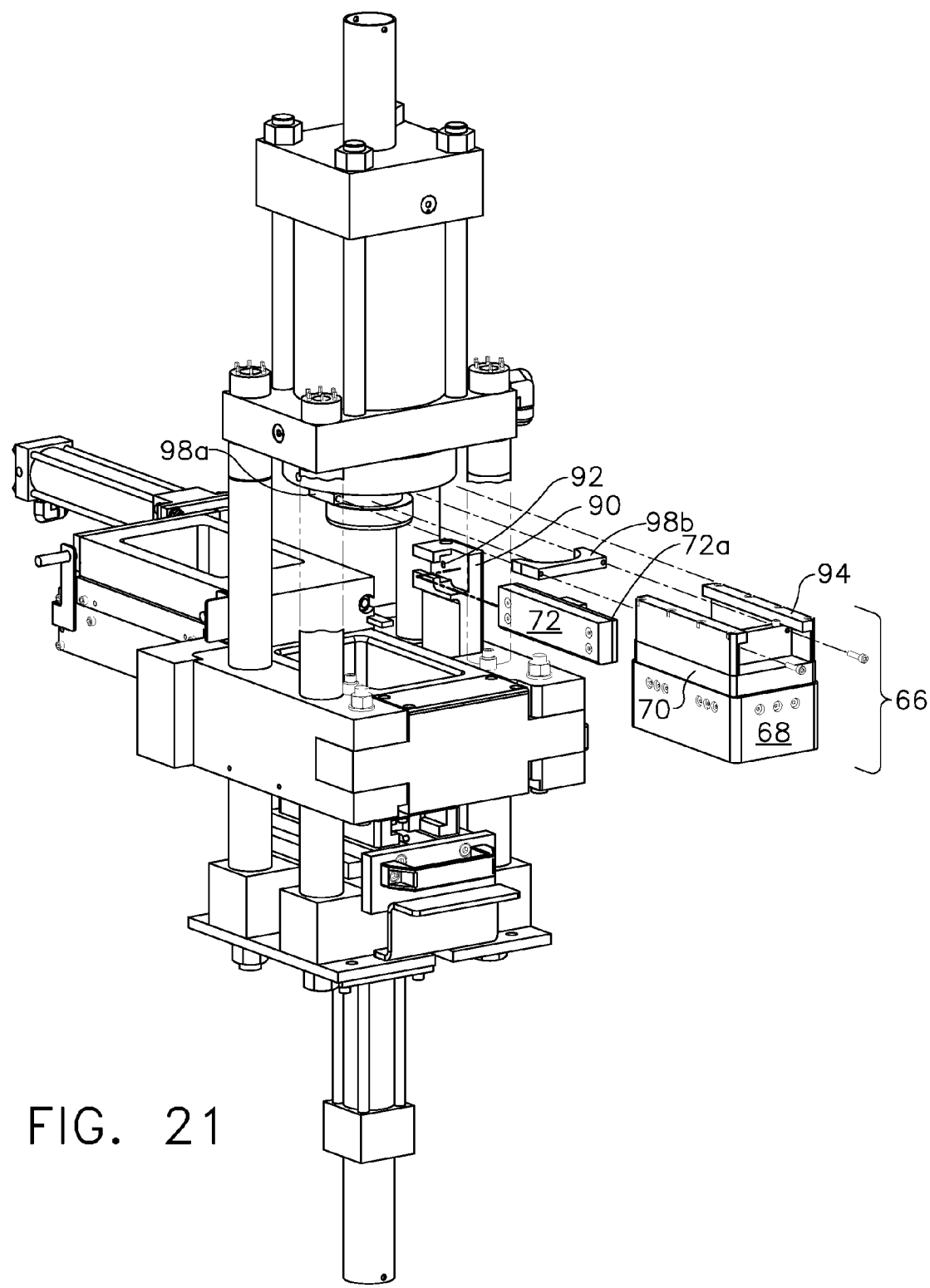
FIG. 21 is a front perspective view similar to FIG. 17, with the spacer installed under the ejection piston, showing the press piston assembly and press piston guide exploded out.
Figure 22:
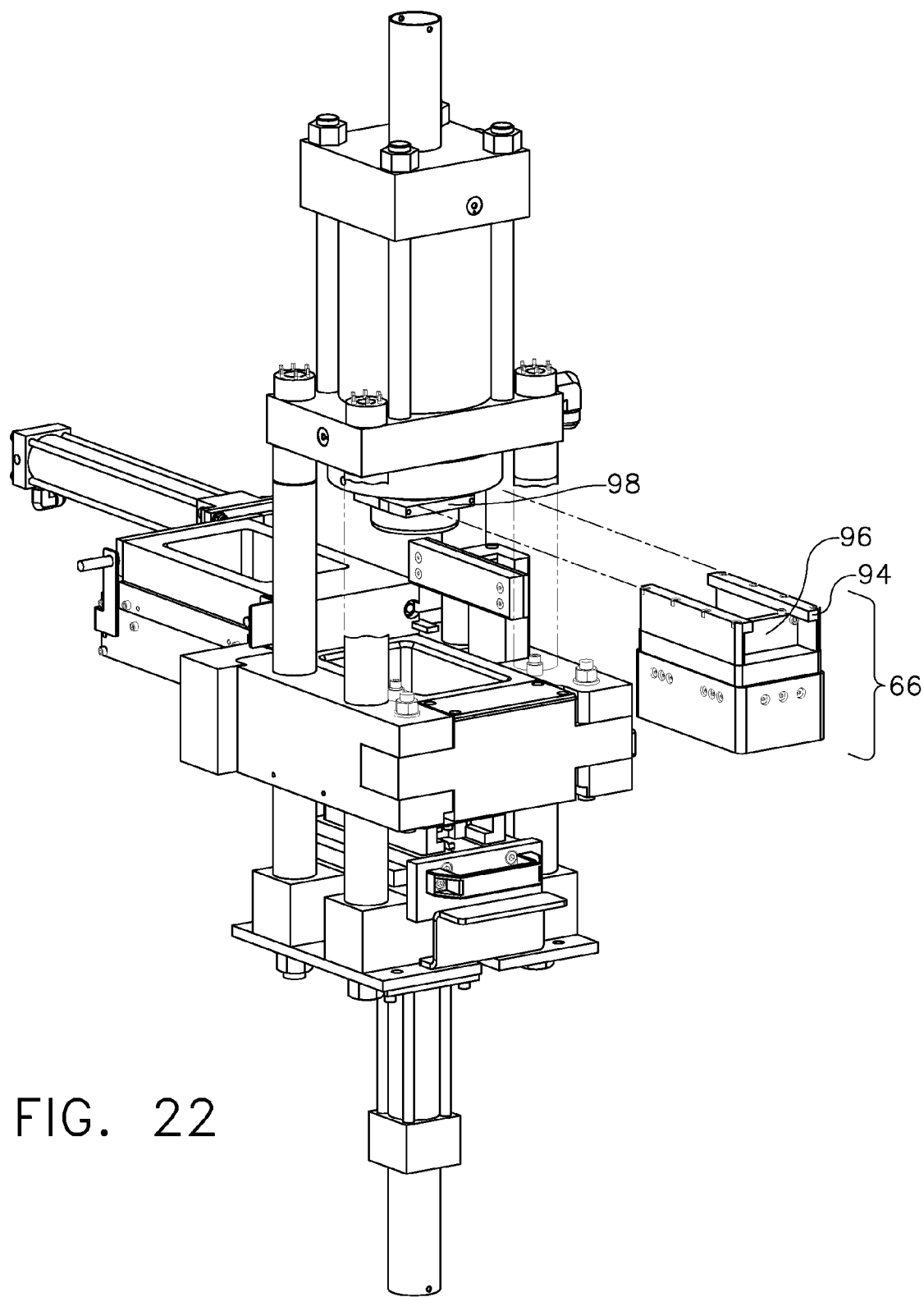
FIG. 22 is a front perspective view similar to FIG. 21, showing the press guide installed.

Referring to FIGS. 21 and 22, press piston assembly 66 and press piston guide 72 are shown in a partially exploded view. Press piston guide 72 may be made of any suitable material, such as UHMW. In the depicted embodiment, press piston guide 72 is attached to metallic backing plate 72a, and mounted to leg 90 of forming assembly 26 via a T shaped mount (partially illustrated) or other suitable shape. Guide 72 may be held in place horizontally by detent 92. Press piston block 70 is mounted to press piston mounting slide, which includes mounting plate 96. Attached to the lower end of press hydraulic cylinder rod 64a is two piece mounting collar 98. Press mounting slide 94 includes two spaced apart parallel legs that slidably fit over collar 89, with end plate 96 being secured to collar 98b so as to retain press piston assembly 66 in its proper position.

Figure 23:
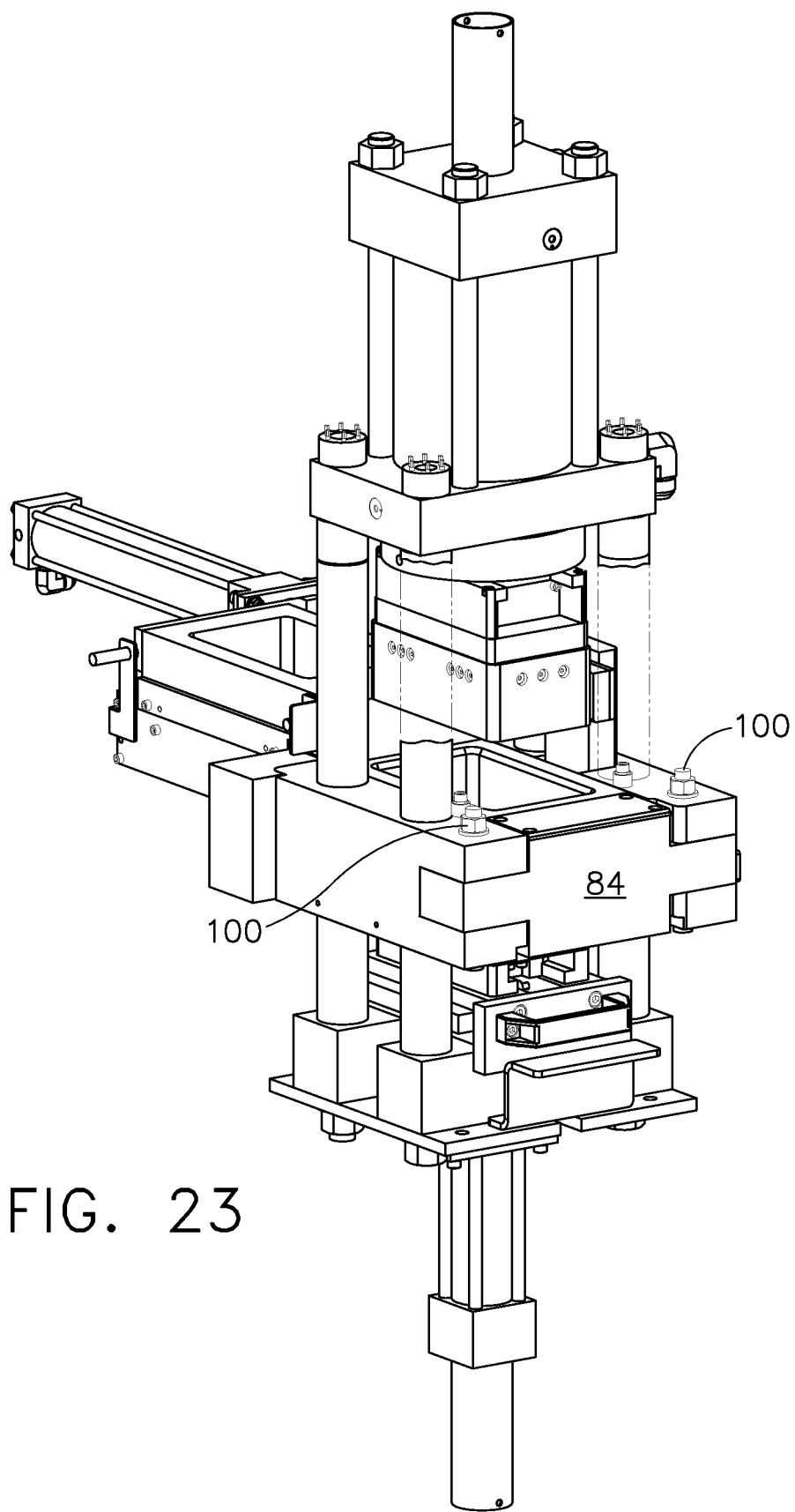
FIG. 23 is a front perspective view similar to FIG. 21, showing the press piston assembly and press piston guide installed.
Figure 24:
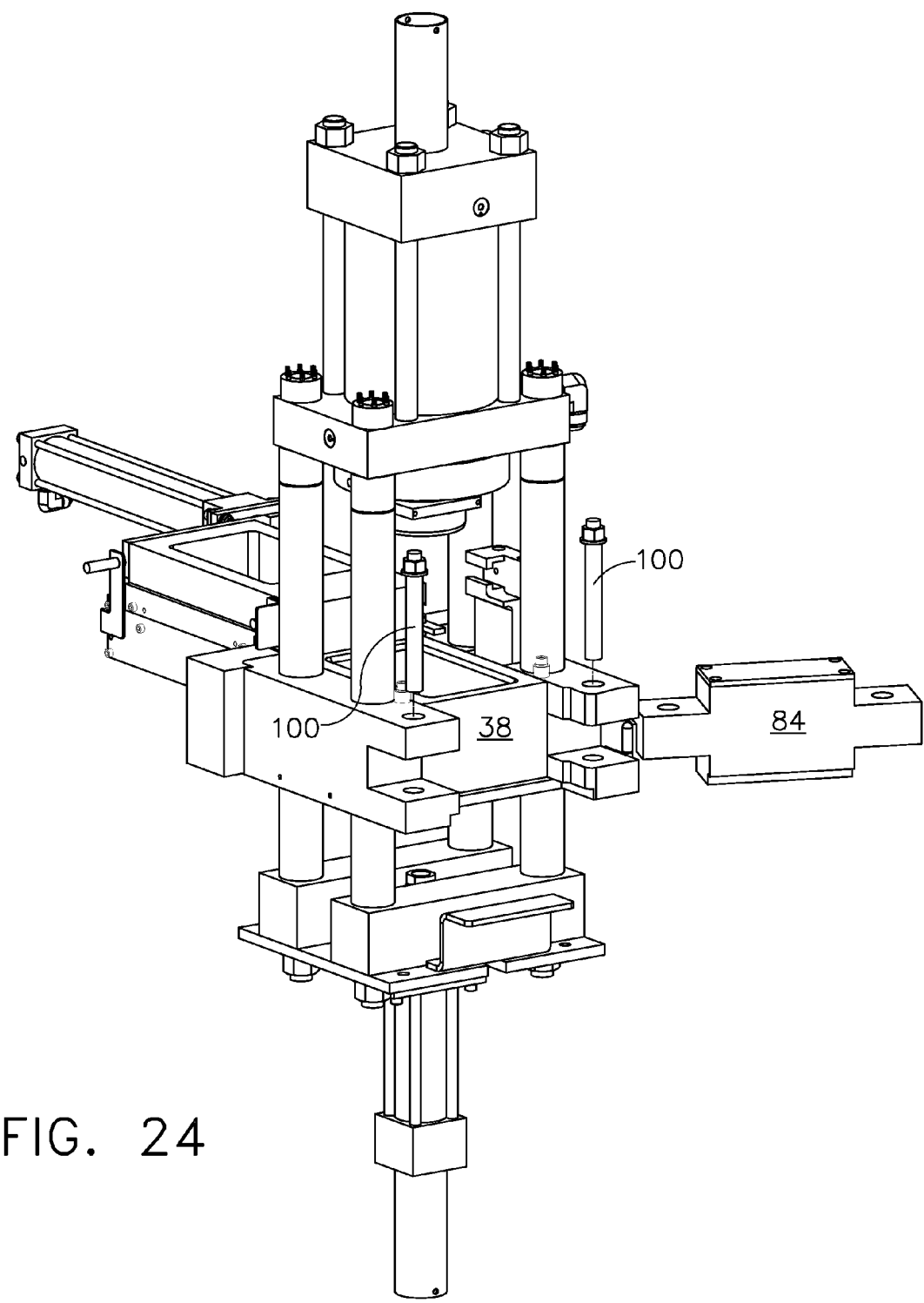
FIG. 24 is an front perspective view of the dosing shuttle and forming assembly, similar to FIGS. 14 and 14A, illustrating a step in the removal process of the forming chamber block and ejection piston.
Figure 25:
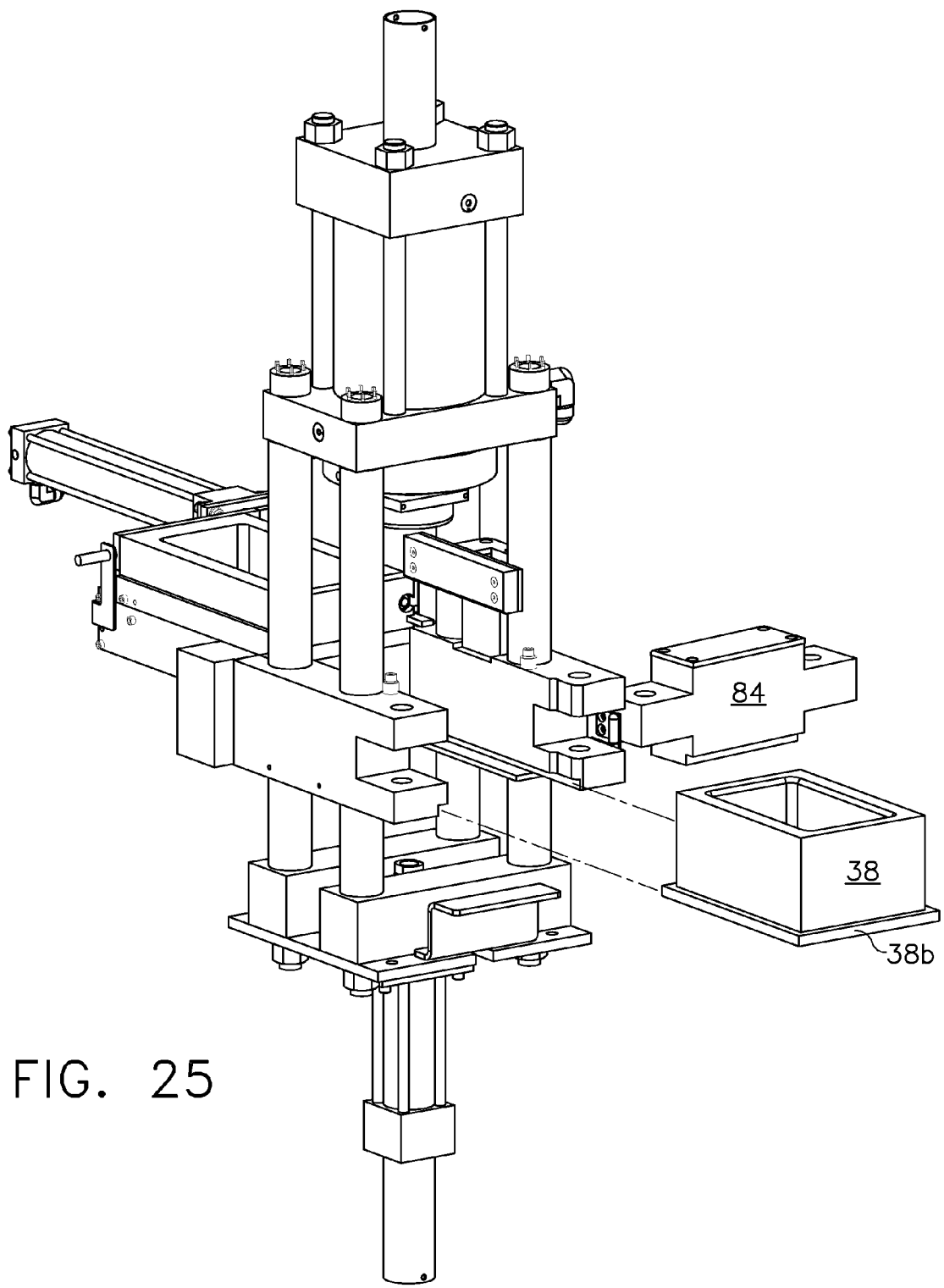
FIG. 25 is a front perspective view similar to FIG. 24, illustrating the forming chamber block and ejection piston removed (and with the press piston omitted).

FIGS. 23-25 illustrate the remaining design configuration of forming assembly 26 that permits quick change of forming block 38 and eject piston 74 to accompany the previously described configurations that allow the quick change of press piston assembly 66 press in as little as ten minutes or less to different perimeter dimensions for the formed block. Front block 84 is held in place by tapered pins 100 having hex nuts on their respective upper ends to allow rotation of tapered pins to facilitate removal along their axes by breaking any bond between the pins and the holes. Once removed, front block 84 may be rotated out of the way to allow forming block 38 to be withdrawn horizontally. Not shown in FIGS. 23-25, if eject piston 74 is to be removed, it is removed concomitantly with forming block 38 while disposed in forming chamber 38a. Forming block 38 includes flange 38b about its lower edge, which locates forming block within forming assembly 26.

Figure 26:
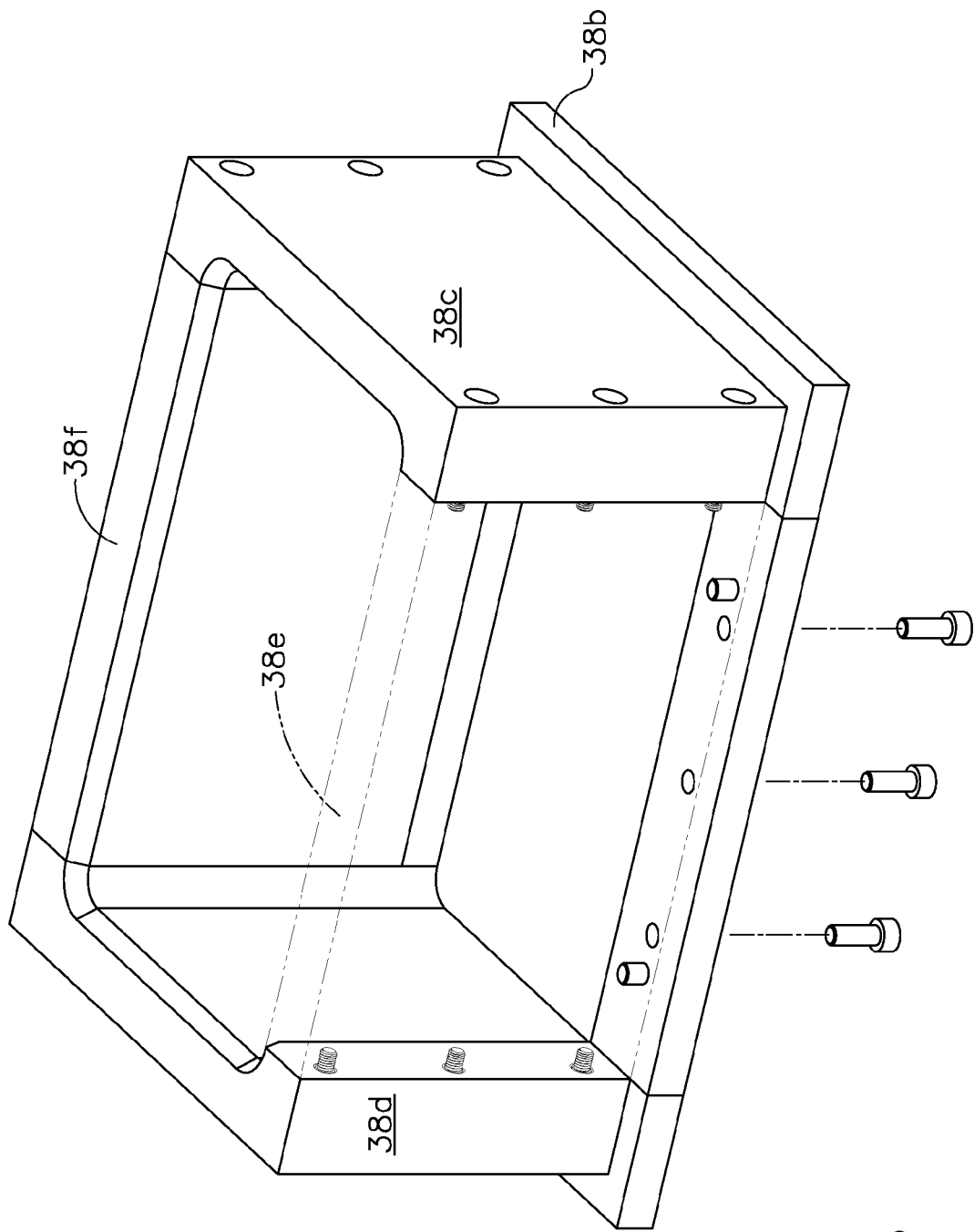
FIG. 26 is side perspective view of the forming chamber block with one side omitted for clarity.

Referring to FIG. 26, forming block 38 may be of any suitable size, shape and material. In the embodiment depicted, forming block 38 comprised end walls 38c, 38d, made of UHMW with side walls 38e and 38f made of stainless steel for dimensional stability and accuracy to avoid temperature gradient induced distortion in the side walls.

FIGS. 27-31 illustrate the process for forming blocks from carbon dioxide particles utilizing a volumetric embodiment of dosing shuttle, identified in these figures as 102. It will be understood that while the shuttle design and volumetric dosing described with regard to these figures is different from the weight based dosing described earlier, the steps of filling the forming chamber, advancing and retracting the press and eject pistons are applicable to the weight based dosing configuration.

Figure 27:
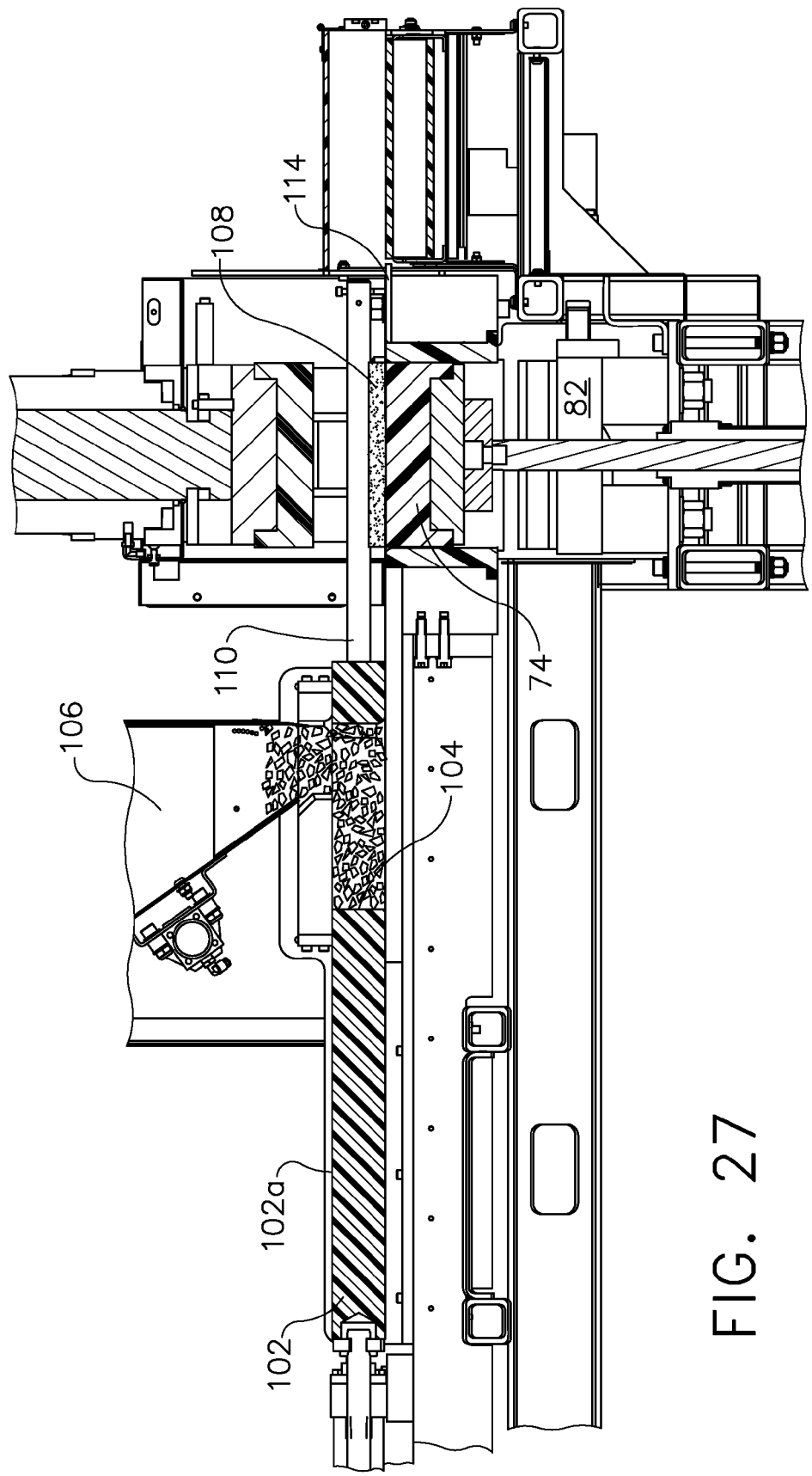
FIGS. 27-31 are side cross-sectional drawings illustrating the process of forming a block.

As seen in FIG. 27, volumetric dosing shuttle 102 includes dosing cavity 104. In the first position, as shown in FIG. 27, dosing cavity 104 directly underlies hopper 106, having no door at the exit of hopper 106, such that particles freely flow into dosing cavity 104. When shuttle 102 is advanced to its second and third positions, upper surface 102a functions as a horizontal door at the exit of hopper 106, blocking an continuous flow of particles. In FIG. 27, eject piston 74 is extended fully up, with a formed block 108 thereon, having a vertical thickness of less than the vertical height of shuttle 102. The exact thickness of block 108 is controlled by the thickness of spacer 82.

Figure 28:
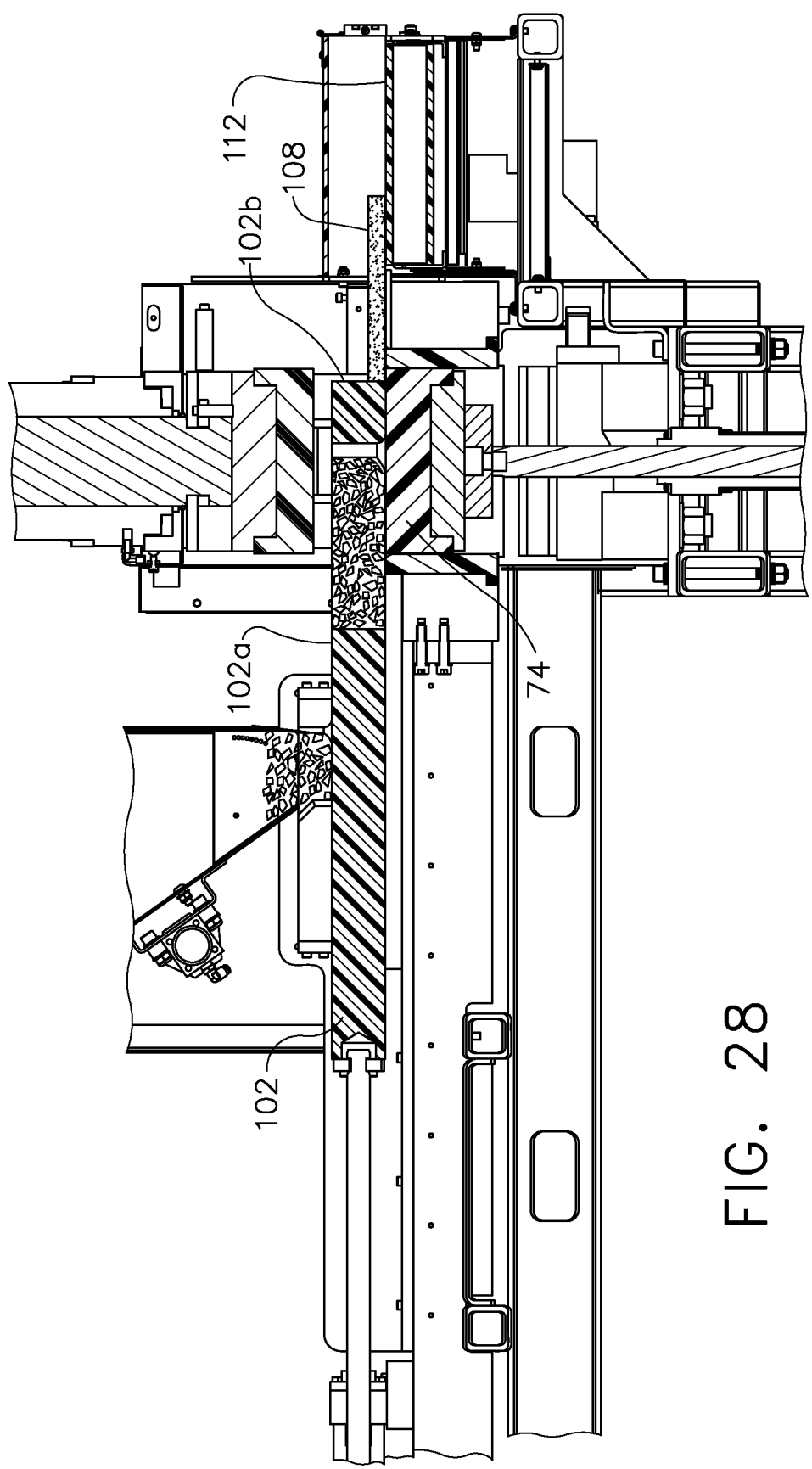
Figure 29:
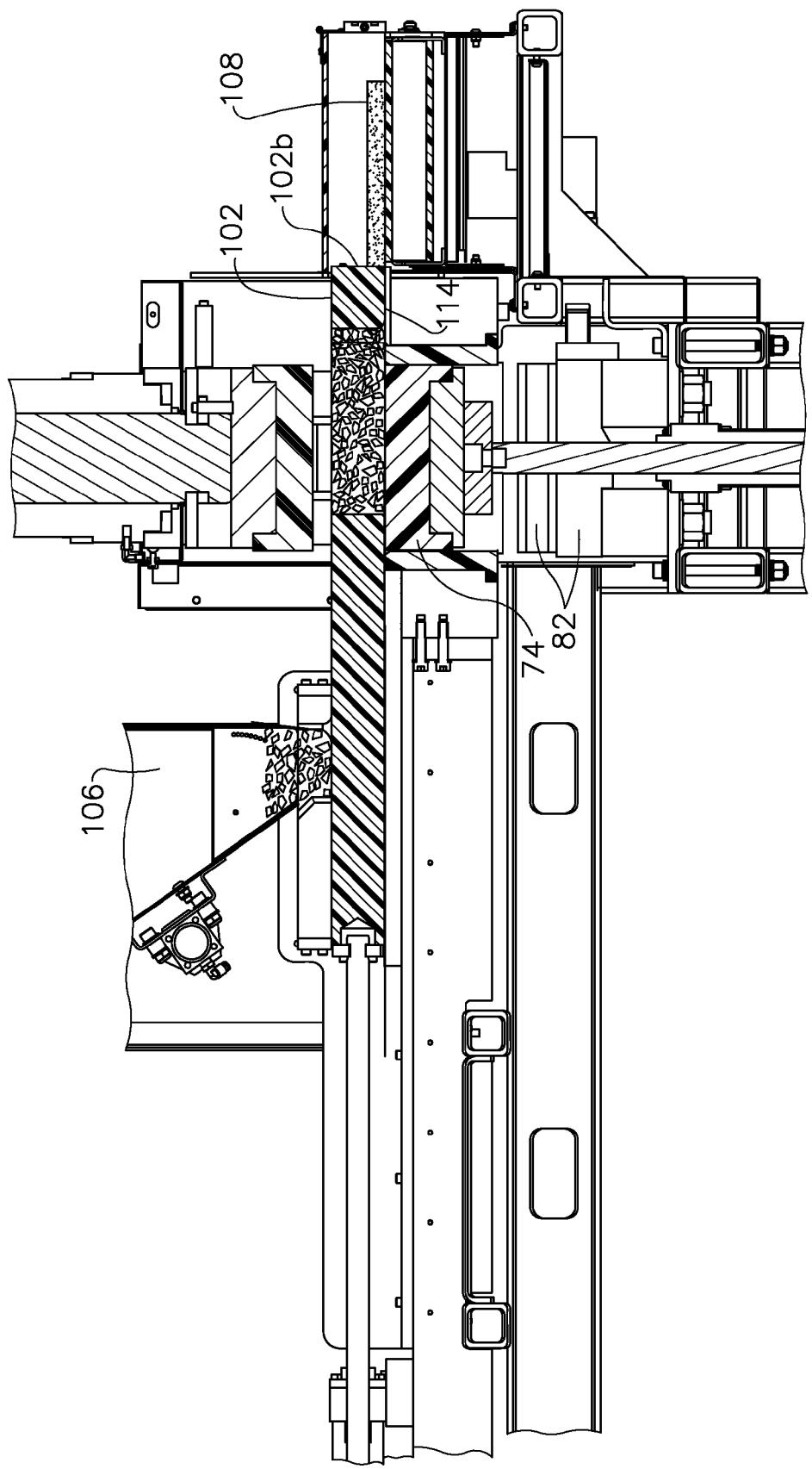

As seen in FIG. 28, shuttle 102 is being advanced from its first position toward the third position, along guide rails 110, to push block 108 onto conveyor belt 112 by the outer distal edge 102b of shuttle 102, passing over UHMW plate 114. The exit of hopper 106 is illustrated blocked by upper surface 102a. Eject piston 74 remains at its upper most position, preventing particles from dropping out of cavity 104. FIG. 29 illustrates shuttle 102 in its fully extended, third position.

Figure 30:
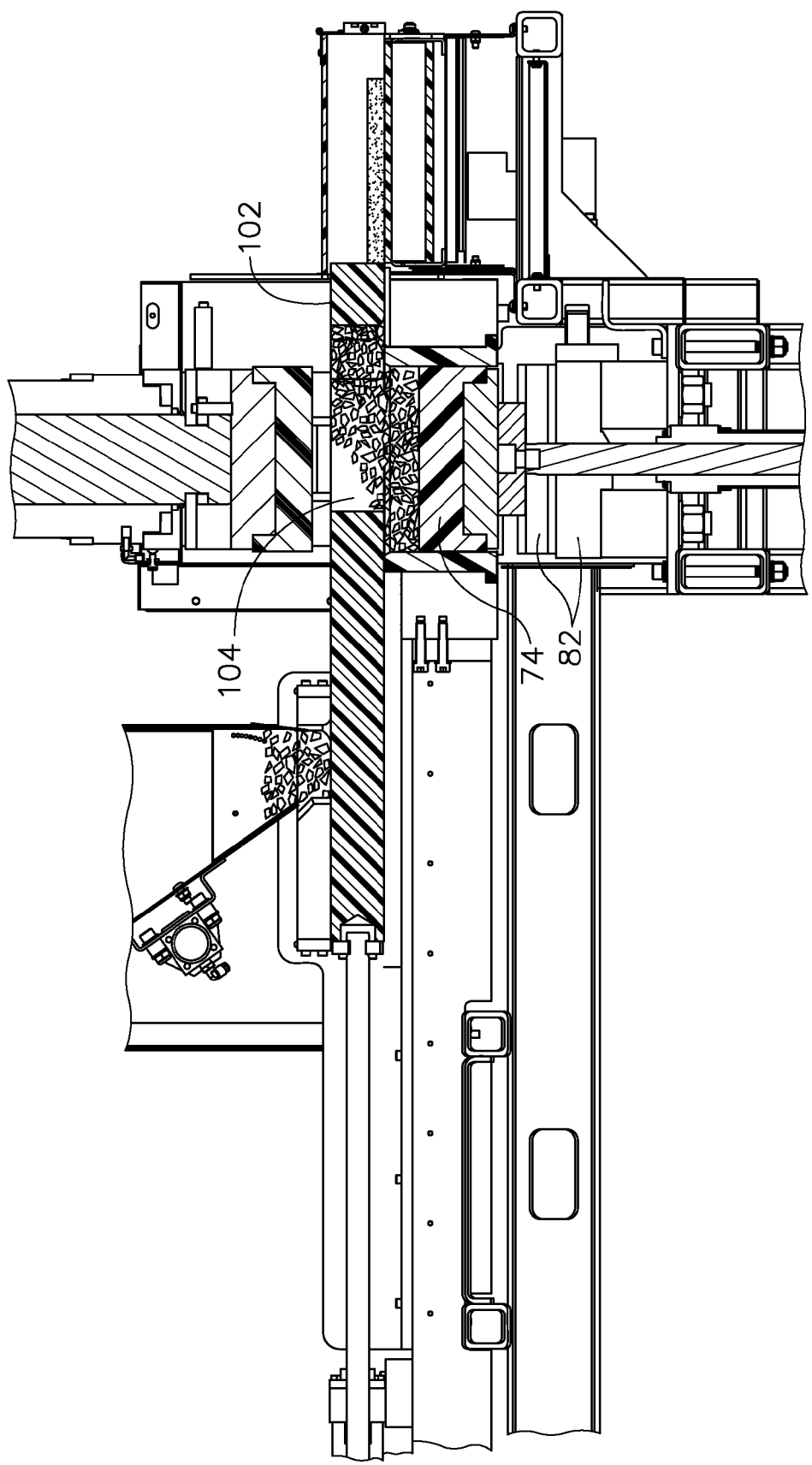
Figure 32:
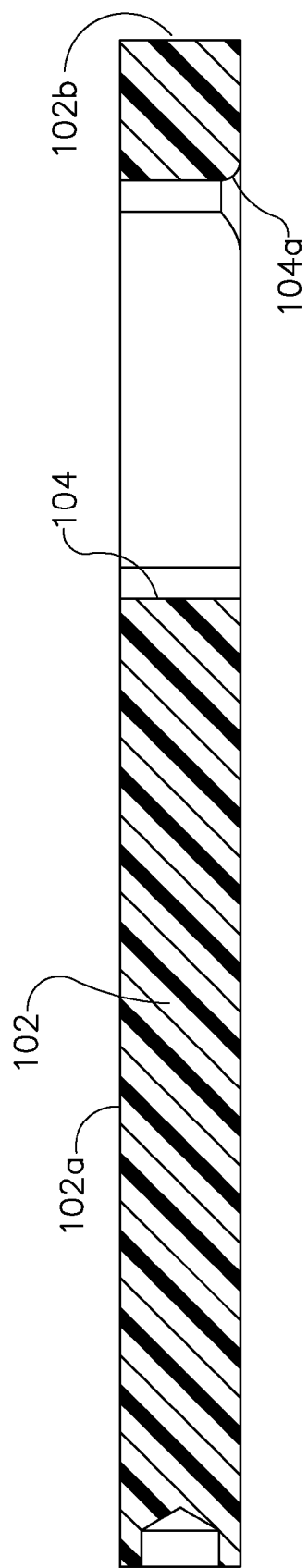
FIG. 32 is a side cross-sectional view of the volumetric shuttle shown in FIGS. 27-31.

Referring to FIG. 30, eject piston 74 has retracted to its lowest position, adjacent atop spacer 82. Particles are falling into the thusly formed forming chamber, completely filling it, leaving excess particles still disposed within dosing cavity 104 as shuttle 102 retracts to its first position. It is noted that the volume defined by volumetric dosing chamber 104 is larger than the volume of forming chamber as defined by the position of eject piston 74 when adjacent spacer 82. This ensures a complete, and therefore controlled and repeatable dosing and resultant block 108. To reduce the possibility of shuttle 102 wiping particles along with it was it retracts past its second position aligned with the forming chamber, trailing edge 104a of dosing cavity 104 of shuttle 102 is curved to direct pellets into the forming chamber, as shown in FIG. 32.

Figure 31:
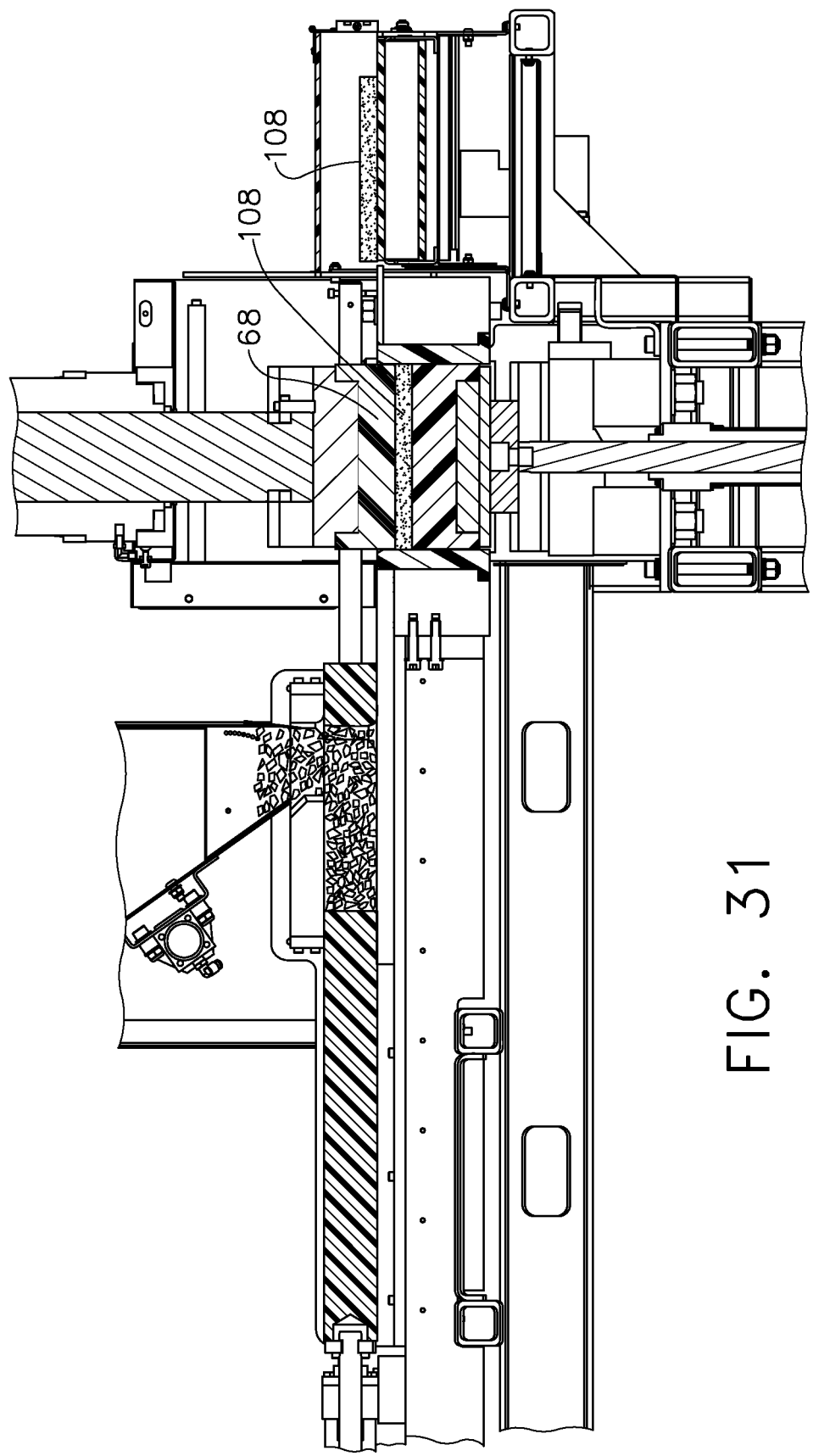

In FIG. 31, press piston 68 has advanced to its full extended position, compressing the particles within the forming chamber to the final block height. Press piston 68 is advanced from its retracted position at its full speed, until the hydraulic pressure of press hydraulic cylinder 64 reaches a predetermined level, at which the speed of press piston 68 is reduced. When the speed of the press piston 68, as monitored by an appropriately placed linear transducer, such as on the hydraulic cylinder rod 64a, drops below a predetermined speed, or the speed profile approaches a predetermined shape, advance of the press piston 68 is stopped, press piston 68 is retracted, and eject piston 74 raised, returning the process to that as shown in FIG. 27, to be repeated cyclically.

Figure 33:
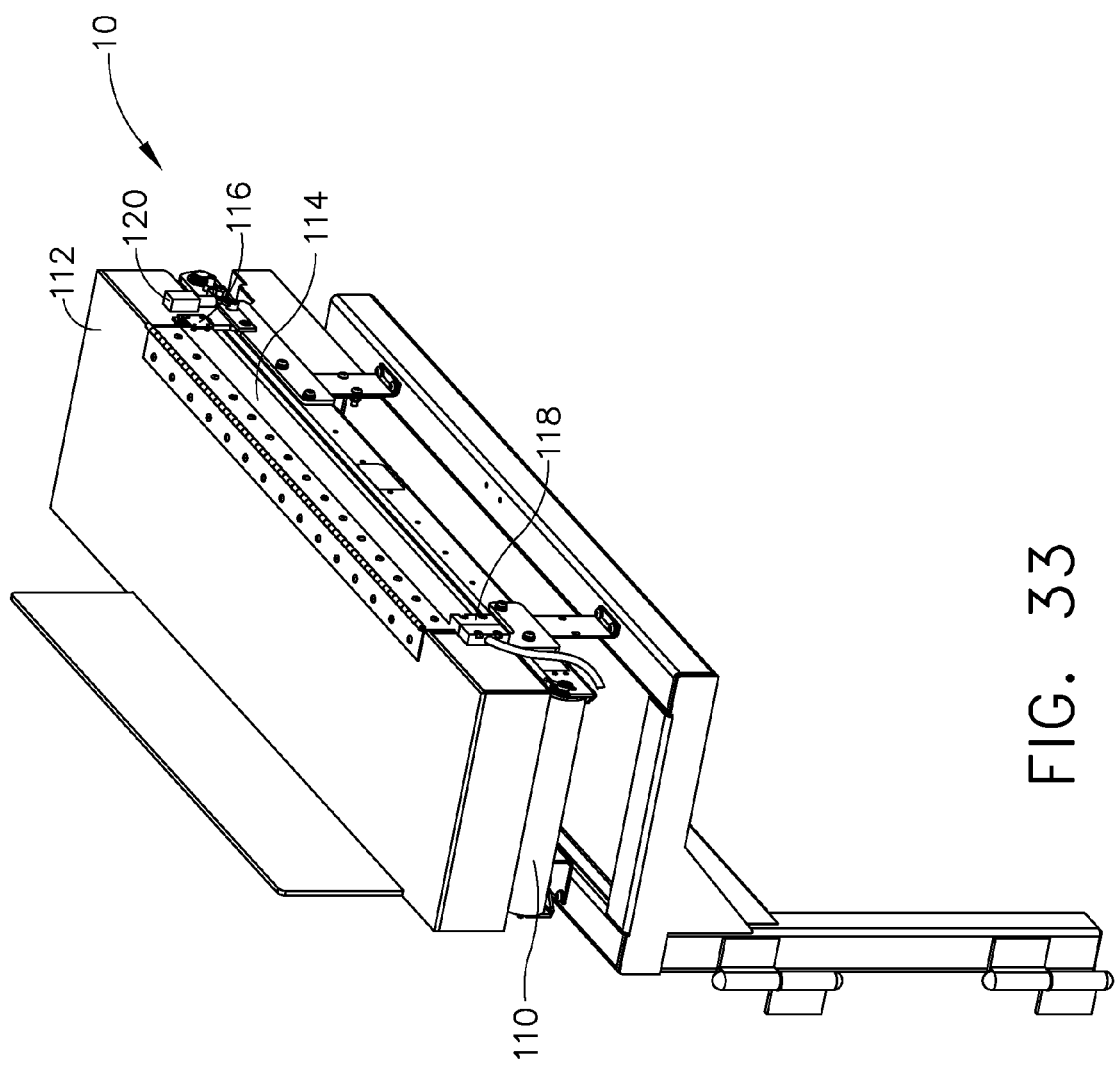
FIG. 33 is a perspective view of the conveyor assembly shown in FIG. 1.

Referring to FIG. 33, conveyor assembly 10 is illustrated. Enclosure 112 overlies conveyor 110, with hinged door 114 along its longitudinal side (relative to discharge direction of conveyor 110). Door 114 is maintained in position by magnetic catch 116. Sensor 118 signals if door 114 is opened, and operation of former 2 is interrupted. This will happen for example if opened by a person during operation, presents a safety hazard. Also, if blocks 108 become jammed on conveyor 110, blocks will push door 114 open, interrupting operation. Adjacent the discharge end of conveyor assembly 10, there is sensor 120. If sensor 120 is blocked longer than a predetermined time, a jam is likely present and the controller interrupts operation.

Referring to FIGS. 34 and 35, conveyor 110 is illustrated supported by a frame. In FIG. 35, a detailed configuration of an embodiment of conveyor 110 is illustrated, showing individual rows 110a of UHMW links driven by sprocket 122.

An alternate embodiment may have a forming block with two chambers and matching two headed press and eject pistons.

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. An apparatus for compressing discrete particles of solid carbon dioxide into a block comprising:
    a. a dosing chamber configured to receive and discharge said particles, said dosing chamber defining a dosing volume, said dosing chamber being moveable from a first position at which said particles are received to a second position, wherein as said dosing chamber moves to said second position particles disposed within said dosing chamber are discharged;
    b. a forming chamber configured to receive said particles from said dosing chamber when said dosing chamber is moved to said second position, said forming chamber at least partially defining a forming chamber volume, said forming chamber volume being capable of being varied from an initial forming chamber volume to a reduced forming chamber volume; and
    c. said dosing volume being larger than said initial forming chamber volume.

2. The apparatus of claim 1, comprising a moveable member configured to vary the forming chamber volume from the initial forming chamber volume to said reduced forming chamber thereby compressing particles disposed within said forming chamber into a block.

3. The apparatus of claim 1, comprising a moveable member configured to eject a block from said forming chamber.

4. The apparatus of claim 1, wherein said dosing chamber includes an opening through which said particles are discharged into said forming chamber when said dosing chamber moves to said second position, said opening including a curved edge.

5. The apparatus of claim 4, wherein said curved edge is a trailing edge.

6. The apparatus of claim 1, comprising a hopper configured to charge said particles into said dosing chamber when said dosing chamber is disposed at said first position.

7. The apparatus of claim 6, wherein said dosing chamber is completely filled when said dosing chamber is disposed at said first position.

8. A method of forming discrete particles of solid carbon dioxide into a block, said method comprising the steps of:
    a. providing a forming chamber configured to receive said particles through an opening, said forming chamber at least partially defining a forming chamber volume, said forming chamber volume being capable of being varied from an initial forming chamber volume to a reduced forming chamber volume;
    b. dispensing a first portion of a volume of said particles into said forming chamber and disposing a second portion of said volume of particles adjacent said opening contiguous to said first portion, said volume of particles being greater than said initial forming chamber volume;
    c. wiping said second portion away from said opening; and
    d. compressing said particles disposed within said forming chamber into a block.

9. The method of claim 8, wherein the step of dispensing and disposing comprises the steps of:
    a. dispensing said volume of particles into a dosing chamber;
    b. moving said dosing chamber into a position at which said first portion of said volume of particles is dispensed into said forming chamber and said second portion of said volume of particles is disposed adjacent said opening.

10. The method of claim 8, wherein the step of dispensing and disposing comprises the steps of:
    a. disposing a dosing chamber at a first position;
    b. dispensing said volume of particles into said dosing chamber;
    c. moving said dosing chamber into a second position at which said first portion of said volume of particles is dispensed into said forming chamber and said second portion of said volume of particles is disposed adjacent said opening.

* * * * *